(12) United States Patent
Suginobu

(10) Patent No.: US 6,286,504 B1
(45) Date of Patent: Sep. 11, 2001

(54) APPARATUS FOR CAPTURING LIGHT ENERGY

(76) Inventor: Koh Suginobu, 304, 13-17, 3-chome, Ichikawa-minami, Ichikawa-shi, Chiba-ken (JP)

( * ) Notice: Subject to any disclaimer, the term of this patent is extended or adjusted under 35 U.S.C. 154(b) by 0 days.

(21) Appl. No.: 09/452,391

(22) Filed: Dec. 1, 1999

(30) Foreign Application Priority Data

| Jul. 1, 1999 | (JP) | 11-187099 |
|---|---|---|
| Jul. 1, 1999 | (JP) | 11-187100 |
| Jul. 1, 1999 | (JP) | 11-187101 |
| Sep. 14, 1999 | (JP) | 11-260198 |

(51) Int. Cl.$^7$ .............................. F24J 2/38; G02B 26/00
(52) U.S. Cl. .................... 126/577; 126/578; 126/606; 126/683; 126/690; 126/696
(58) Field of Search .................... 126/574, 576, 126/577, 578, 601, 605, 606, 607, 683, 690, 696, 698; 250/203.4; 136/246

(56) References Cited

U.S. PATENT DOCUMENTS

| 4,086,485 | * | 4/1978 | Kaplow et al. | 126/574 |
|---|---|---|---|---|
| 4,317,031 | * | 2/1982 | Findell | 126/577 |
| 4,340,812 | * | 7/1982 | Mori | 126/698 |
| 4,995,377 | * | 2/1991 | Eiden | 126/605 |
| 5,062,899 | * | 11/1991 | Kruer | 126/696 |

FOREIGN PATENT DOCUMENTS

| 51851 | * | 1/1985 | (EP) | 126/606 |
|---|---|---|---|---|
| 130486 | * | 1/1985 | (EP) | 126/605 |
| 358019655 | * | 2/1983 | (JP) | 126/606 |
| 3-44282 | | 7/1991 | (JP) | . |
| 4-47801 | | 8/1992 | (JP) | . |
| 4-73922 | | 11/1992 | (JP) | . |
| 6-125652 | | 5/1994 | (JP) | . |
| 11-232915 | | 8/1999 | (JP) | . |

* cited by examiner

*Primary Examiner*—Sara Clarke
(74) *Attorney, Agent, or Firm*—Sughrue, Mion, Zinn, Macpeak & Seas, PLLC

(57) ABSTRACT

An apparatus for capturing solar radiation of tracking type including a matrix array of a number of light receptors is disclosed. A first set of four shafts are disposed parallel to each other and parallel to a floor surface on which the apparatus is installed. A second set of four shafts are mounted on each shaft in the first set, and four light receptors per one shaft in the second set including 4×4 equal to 16 shafts are supported, thus providing a total of 64 light receptors. Each light receptor internally contains a mirror having four sections, and four parabolic mirrors of a reduced diameter which reflect light reflected by respective sections to the center of each section. Where the light receptors constitute a light collector which condenses and projects solar radiation into optical fibers, a conical opening having a reflecting surface is defined centrally in each section, with a light receiving end face of an optical fiber disposed at the bottom thereof. Where the light receptors constitute a heat collector which converts the solar radiation into heat to heat a heat exchange fluid, a photo-thermal conversion surface is formed in the form of a conical opening centrally in each section, with a channel for a heat exchange fluid disposed therearound.

27 Claims, 28 Drawing Sheets

Fig. 6a
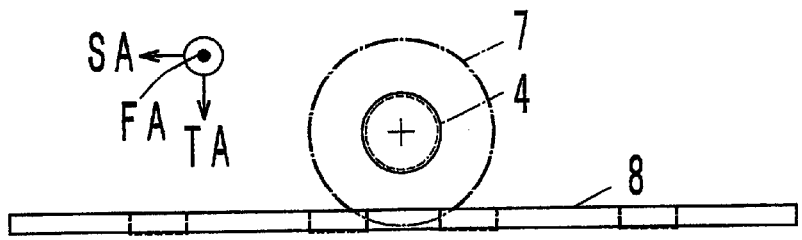
Fig. 6b
Fig. 6c
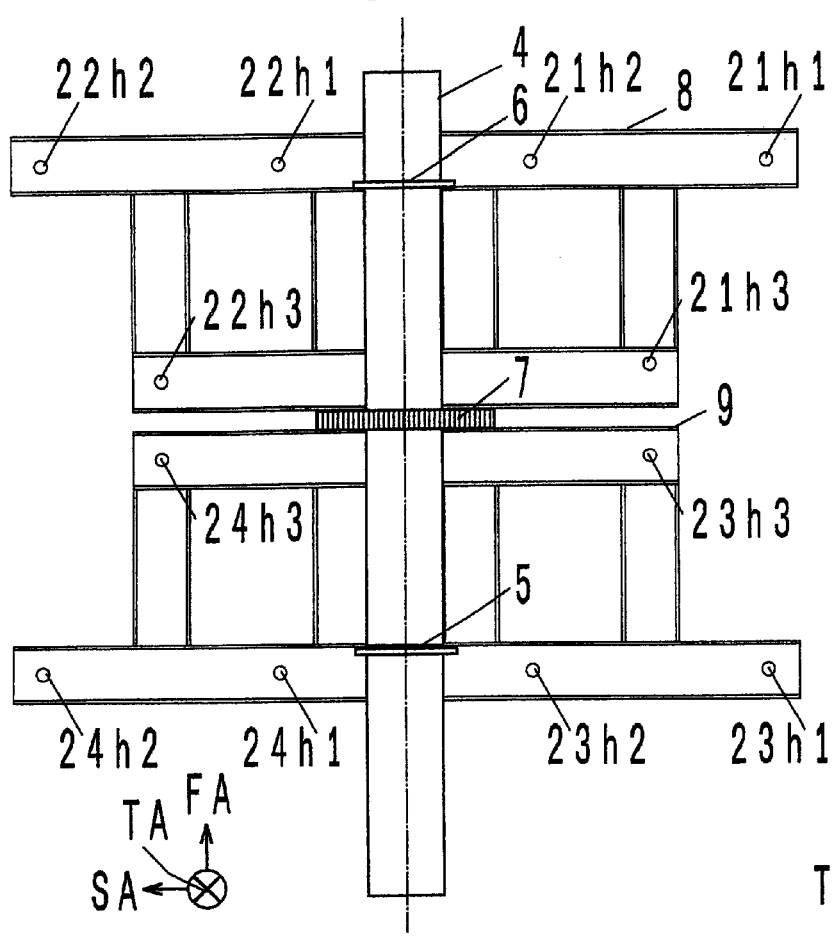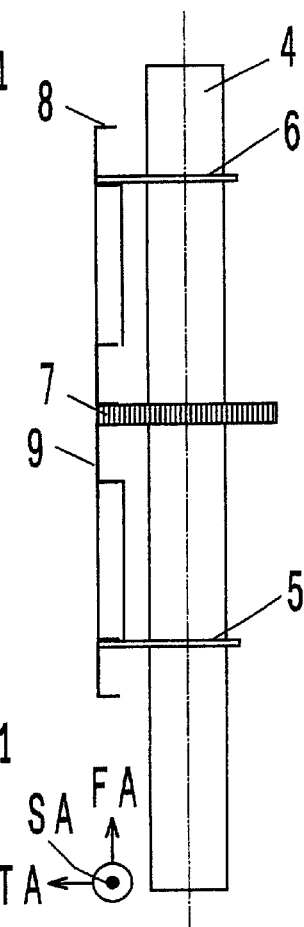

APPARATUS FOR CAPTURING LIGHT ENERGY

FIELD OF THE INVENTION

The invention relates to an apparatus for capturing light energy which may be used in solar radiation utilization mechanism such as solar beam reflector (heliostat), solar beam collector (condenser), solar beam photothermal transducer (heat collector) or solar generator (solar cell), and in particular, to such an apparatus which is adapted to track the motion of the sun to orient the solar radiation utilization mechanism in a direction which maximizes the solar radiation utilization efficiency. The solar radiation utilization mechanism mentioned above is referred to herein as "light receptor".

BACKGROUND OF THE INVENTION

An apparatus of the kind described is typified by an arrangement in which a light receptor or collector having the end face of an optical fibre disposed at the focal position of an optical lens thereof is driven in a tracking manner. One such arrangement comprises a vertical stanchion disposed in an upright position with respect to a horizontal plane and rotatable about a vertical axis through an angular range substantially equal to 180° from the east to the west orientation, a light receptor support frame carried in a horizontal plane by the stanchion so as to be rotatable about a horizontal axis, an azimuth drive mechanism for rotatively driving the stanchion about the vertical axis, and an elevation drive mechanism carried by the azimuth drive mechanism for driving the receptor support frame for rotation about the horizontal axis, as disclosed in Japanese Patent Publication No. 73,922/1992. A support arrangement of the described type requires a rigid structure to support the vertical stanchion against an increased load which results when it is desired to increase a light receiving area. Specifically, as the light receiving area is increased, the receptor gains its height, necessitating a design which assures a more firm support for the stability of the receptor together with a more rigid structure to withstand a resulting increased wind pressure. Also there arises a concern that the structure may interrupt the incidence of sunbeam to a third party land located around or adjacent to the lot where the solar radiation utilization mechanism is installed. On the other hand, if the light receiving area per unit or individual receptor is decreased while a number of receptor supports are arranged in a matrix array, the wind pressure load on each unit can be minimized and no undue strength is required for the receptor support structure. This also avoids the possibility of intercepting the incidence of sunbeam onto a third party land. However, because each unit must be provided with an azimuth and an elevation drive mechanism, the number of such drive mechanisms required for the total light receiving area or the bank of receptor supports in the matrix array will be prohibitive, resulting in an inefficiency in the mechanism investment.

Japanese Patent Publication No. 47,801/1992 discloses a three-axis receptor support arrangement including a support framework which is mounted on the vertical stanchion that is rotatively driven by the azimuth drive mechanism and which is driven for rotation about an east-west axis, the support framework carrying a number of elevation drive mechanisms, each of which is operable to support the base of an individual receptor. Since a plurality of elevation mechanisms are supported by a single azimuth mechanism, this reduces the total number of drive mechanisms for the total light receiving area, providing an advantage in respect of mechanism investment. However, the single vertical stanchion must support the framework carrying the entire elevation mechanisms for rotation in the azimuth direction, and accordingly, the load on the stanchion increases and therefore there must be provided a strengthened support structure.

A most typical light collector of the prior art is designed such that a front end face of an optical fibre is positioned at the focus of a condenser lens, an example being disclosed in Japanese Patent Publication No. 44,282/1991. A convex lens is not suitable for use as a solar radiation condenser lens since an increased thickness results for a larger diameter collector. Fresnel lens is in the form of a plate of a reduced thickness, which does not increase significantly even for a larger diameter collector, and thus is adequate to be used as a condenser lens. However, when the angle of incidence of light upon the front end face of the optical fibre or the angle with respect to the centerline of the optical fibre increases, the light will be reflected by the total reflection and cannot pass into the optical fibre. Thus if a Fresnel lens is used which has a large diameter of its light responsive area combined with a reduced focal length, the majority of condensed light cannot find its way into the optical fibre and there occurs a need to increase the focal length as the collector area or its diameter is increased. This results in increasing the distance between the lens and the front end face of the optical fibre, and thus results in a light collector which exhibits an increased thickness or tallness in a direction toward the sun. To avoid this, the common practice has been to provide a honeycomb array comprising a number of lenses of a reduced diameter in order to construct an extensive light receiving surface, with the front end face of each optical fibre positioned at the focal position of each individual lens, as disclosed in Japanese Patent Publication No. 44,282/1991. Also a solar radiation collector system is disclosed in Japanese Patent Publication No. 73,922/1992 which controls a light collector comprising a honeycomb array of small diameter lenses so as to be oriented toward the sun.

It is to be noted however that the light receiving area per fibre is reduced, and consequently, the number of fibres must be increased in order to provide an extensive light receiving area. When the light receiving area per fibre is small, the amount of light which must be transmitted is low, and hence an optical fibre of a reduced diameter can be used. On the other hand, an increasing difficulty is experienced, as the fibre diameter is reduced, in properly positioning and maintaining the front end face of the fibre in focus as the motion of the sun is being tracked. Because of such difficulty, the diameter of the optical fibre cannot be reduced significantly, resulting in using an excessive amount of optical fibre material.

A heat collector, that is, a light receptor which receives solar radiation and converts it into heat is known in the art in which a piping with a black surface is disposed for purpose of photo-thermal conversion process at the focal position of a convex lens or a mirror which is semicircular or parabolic in cross section and which is elongate longitudinally with a flow of water being passed through the piping to serve as a conversion process fluid. For the reason as mentioned previously, a convex lens is not preferred as a condenser lens, but Fresnel lens is preferred. Since the light will be reflected by the total reflection to degrade the light collection efficiency if an angle of incidence of the light upon the photo-thermal conversion surface or the angle with respect to a perpendicular to the surface is large, it is necessary to increase the focal length as the diameter (or area) of the light receiving surface of the lens is increased. This remains true if a mirror is used. The consequence of this shows up as a heat collector which is tall in a direction toward the sun. Light condensing or focussing effect takes place in the transverse section, but does not take place in the longitudinal direction, resulting in a low light collection density and rendering it difficult to achieve a heat collection to an elevated temperature.

SUMMARY OF THE INVENTION

The present invention has for its first object to enable a low elevation light collection over an extensive area, and has for its second object to minimize a quantity of elements in drive mechanisms which are required for a given total light receiving area. A third object is to achieve a reduction in the amount of optical fibre material required for a given total light receiving area or such material per unit receiving area in the manner of "light collection" into the optical fibres, and a fourth object is to reduce a thickness or tallness of the heat collector in a direction toward the sun and to enable a heat collection to an elevated temperature in the manner of "heat collection" which occurs by conversion of solar radiation into heat.

In accordance with the invention, a mechanical mechanism which supports a light receptor as oriented toward the sun comprises a first shaft (B1) in a first set of shafts including one or more shafts (B1–B4) extending in a given direction (SA); a bearing (C11, C12) for rotatably supporting the first shaft (B1) about the axis thereof; first drive means (ES1, D11) for driving the first shaft for rotation; a first support assembly (A11) including a first shaft (4) in a second set of shafts extending in a direction (FA) orthogonal to the first shaft (B1) in the first set and supported by the first shaft (B1) in the first set so as to be rotatable about the axis thereof extending in said direction (FA) for supporting a first set of light receptors (21–24); a second support assembly (A12) including a second shaft in the second set supported by the first shaft (B1) in the first set and which are supported in the same manner as the first shaft (4) in the second set for supporting a second set of light receptors; and second drive means (I11, EF1) for driving the first and the second shaft in the second set for rotation.

In a preferred embodiment of the invention, the first support assembly (A11) includes a first wheel (7) fixedly mounted on the first shaft (4) with its center of rotation aligned with the axis thereof, and a first worm (12) disposed to be parallel to the first shaft (B1) and in meshing engagement with the first wheel (7); the second support assembly (A12) includes a second wheel fixedly mounted on the second shaft in the second set with its center of rotation aligned with the axis thereof, and a second worm disposed to be parallel to the first shaft (B1) and in meshing engagement with the second wheel; and the second drive means including a fastener member (I11) for mechanically coupling the first and the second worm together for simultaneous rotation in the same direction.

In a most typical manner of use, the given direction (SA) is a horizontal axis extending in the east-and-west direction. In this instance, the first shaft (B1) in the first set represents a center of rotation for elevational motion, a surface (Sp) parallel to the first shaft (B1) represents a horizontal plane or a roof-top plane, and the first drive means (ES1, D11) is a drive for elevational motion. The first and the second shaft (4) in the second set represent centers of rotation for azimuthal motion, and the fastener member (I11) and the second drive means (EF1) constitute together the azimuthal drive.

An elevation mechanism which essentially comprises the first shaft (B1) in the first set supports two azimuth mechanisms, namely, the first and the second support assembly (A11, A12), each of which essentially comprise the first shaft (4) or the second shaft in the second set, respectively. In this manner, a quantity of light receptors (or an extensive total light receiving area) can be supported by a reduced amount of mechanisms.

The first and the second support assembly (A11, A12) are distributed in a direction (SA) which extends along the east-and-west axis, thus allowing an extensive light receiving area to be secured without any significant increase in the elevation. A third and a fourth support assembly (A13, A14) may be mounted on one (B1) in the first. In this instance, the first shaft (B1) in the first set will increase in length, but by having it supported by the plane (Sp) in parallel relationship thereto through a plurality of bearings (C11–C14), which are distributed in the lengthwise direction (SA), the load from the bank of support assemblies (A11–A14) are distributed in the direction (SA) along the center axis of the first shaft (B1) in the first set to be borne by the plane (Sp). Because the load is dispersed in one axial direction (SA) in the plane (Sp), the support structure for the first shaft (B1) in the first set is not required to be as rigid as required for the support structure of a conventional vertical stanchion, thus facilitating the installation of the first set of shafts (B1–B4).

In a preferred embodiment of the invention, the light receptor serves as a light collector which collects solar radiation into an optical fibre. The light collector comprises a casing including a bottom plate (31), side plates (33) defining an opening which is located opposite the bottom plate and a light transmitting member (36/36f) which closes the opening; a first mirror (40a) disposed within the casing to reflect light which passes through the light transmitting member (36/36f) into the casing; a second mirror (52) formed by a curved mirror of a compact size and having a reduced focal length which is disposed forwardly of the first mirror (40a) within the casing and carried by the light transmitting member (36/36f) to reflect reflected light from the first mirror (40a); and an optical fibre (71) having a front end face which is disposed in opposing relationship with the second mirror (52) and having a center axis which is aligned with the optical axis of the second mirror (52), at least one of the light transmitting member (36/36f) and the first mirror (40a) forming a light condensing element having an increased focal length. With this arrangement, one of the light transmitting member (36/36f) or the first mirror (40a) which has the increased focal length is effective to condense light, which light is reflected by the first mirror (40a) toward the light transmitting member (36/36f) and then reflected by the second mirror (52) toward the bottom plate (31) in a fold-back manner to cause it to impinge on the optical fibre (71). A light path is thus formed by the light transmitting member (36/36f), the first mirror (40a), the second mirror (52) and the optical fibre (71). The light path has a length which is approximately on the order of 2.5 times the distance between the light transmitting member (36/36f) and the bottom plate (31), allowing focussed light to impinge on the light receiving end of the optical fibre (71) with a relatively small angle of incidence even for a relatively small distance between the light transmitting member (36/36f) and the bottom plate (31). In this manner, it is possible to achieve a design with a reduced tallness or thickness in a direction viewing the sun while reducing the amount of optical fibre used per light receiving area if the light collector is designed with an increased light receiving area. Reception of light over an extensive area is enabled with a low posture.

In another preferred embodiment of the invention, the light receptor constitutes a heat collector which converts received solar radiation into heat for heating a heat exchange fluid. The heat collector comprises the casing, the first mirror (40*a*) and the second mirror (52), which are mentioned above, a photo-thermal conversion member (61) including an photo-thermal conversion surface (63) disposed opposite to the second mirror (52) and a channel (15*a*, 140, 145*b*) through which a heat exchange fluid is passed, and a fluid feed/discharge tube (143/144) connected to the channel, at least one of the light transmitting member (36) and the first mirror (40*a*) forming a light condensing element having an increased focal length. With this arrangement, one of the light transmitting member (36) or the first mirror (40*a*) which has the increased focal length is effective to condense light, which is reflected by the first mirror (40*a*) toward the light transmitting member (36) and then reflected by the second mirror (52) toward the bottom plate (31) in a fold-back manner to irradiate the photo-thermal conversion surface (63) of the conversion member (61). A light path is formed by the light transmitting member (36), the first mirror (40*a*), the second mirror (52) and the conversion surface (63), and has a length which is approximately on the order of 2.5 times the distance between the light transmitting member (36) and the bottom plate (31), allowing the focused light to impinge on the conversion member (61) with an angle which assures a high efficiency of photo-thermal conversion for a relatively short distance between the light transmitting member (36) and the bottom plate (31). In this manner, it is possible to achieve a design with a reduced tallness or thickness in a direction viewing the sun if the heat collector is designed with an increased light receiving area. Reception of light over an extensive area is enabled with a low posture. A high collection density and a heat collection to an elevated temperature are enabled.

Where the light receptor comprises a solar cell panel, the light receiving surface may be oriented toward the sun to permit an efficient conversion of the solar radiation into electric power.

BRIEF DESCRIPTION OF THE DRAWINGS

Other objects and features of the present invention will be readily appreciated as the same becomes better understood by reference to the following detailed description of the preferred embodiments when considered in connection with the accompanying drawings, in which:

FIGS. 6*a*, 6*b* and 6*c* are a front view, a bottom view and a left-hand side elevation, respectively, of support frames 8, 9 which are integral with the shaft 4 in the second set shown in FIG. 4;

DESCRIPTION OF THE PREFERRED EMBODIMENTS

First Embodiment

Figure 1:
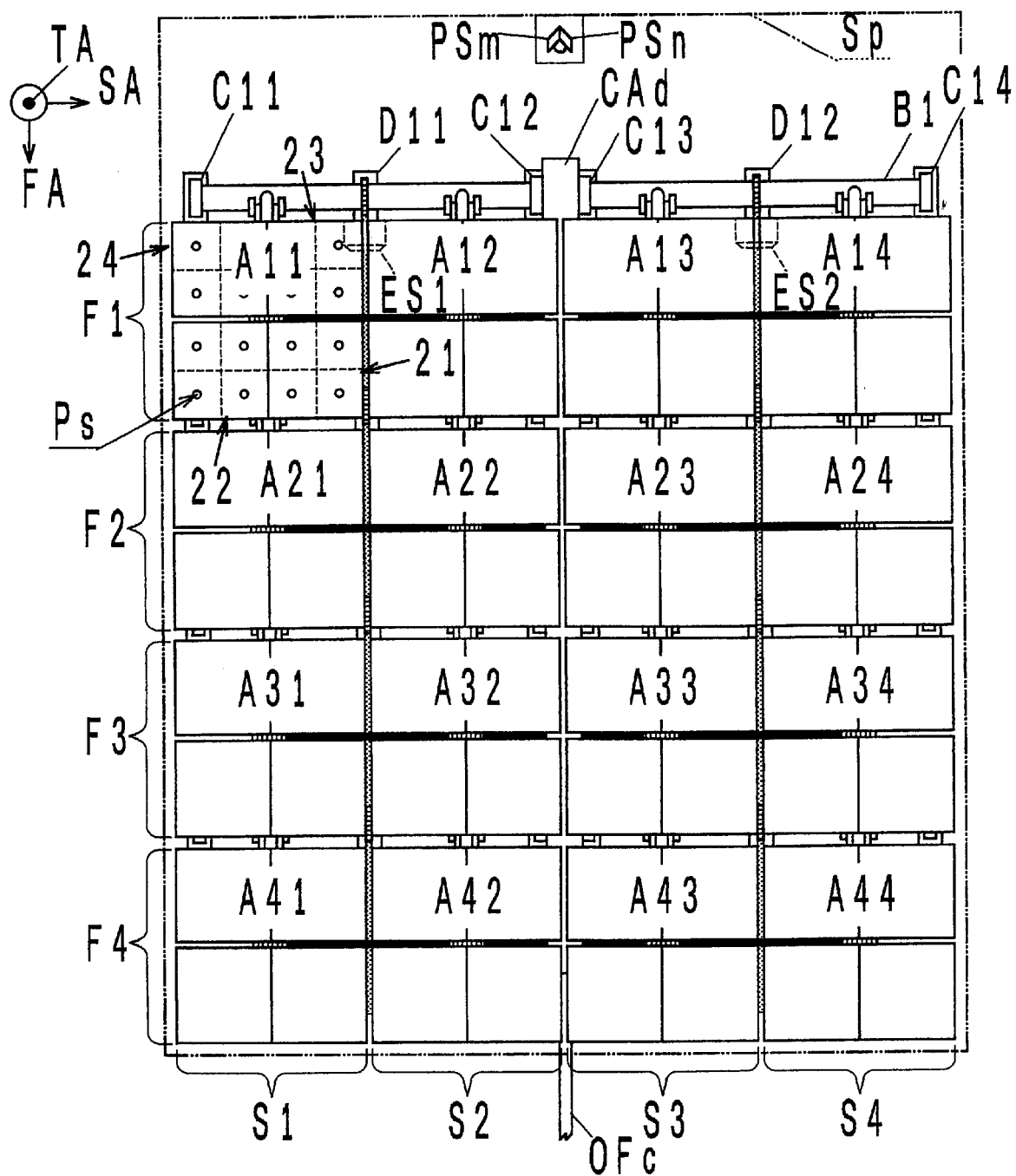
FIG. 1 is a plan view of one embodiment of the invention, with support assemblies A11–A44 shown in their reference or standby attitudes.

Referring to FIG. 1, 4×4=16 support assemblies A11–A14, A21–A24, A31–A34 and A41–A44 are disposed in a matrix array along a reference plane Sp. The four support assemblies A11–A14 in a first set are supported by a first shaft B1 in a first set; the four support assemblies A21–A24 of a second set are supported by a second shaft B2 in the first set; the four support assemblies A31–A34 of a third set are supported by a third shaft B3 in the first set; and the four support assemblies A41–A44 of a fourth set are supported by a fourth shaft B4 in the first set.

Figure 2:
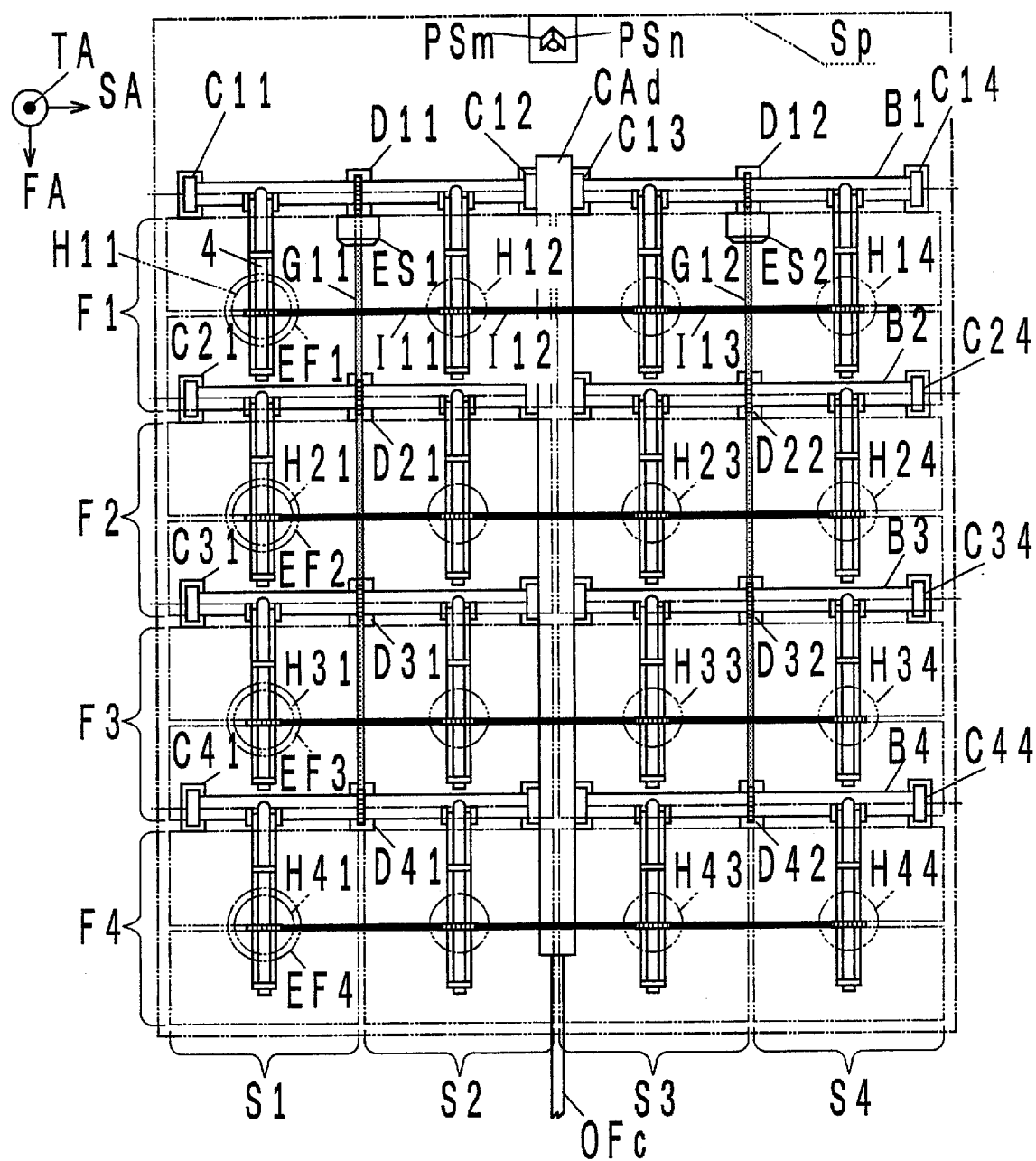
FIG. 2 is a plan view of the embodiment shown in FIG. 1, with the support assembly A11–A44 removed and indicated in thin phantom lines.
Figure 3:
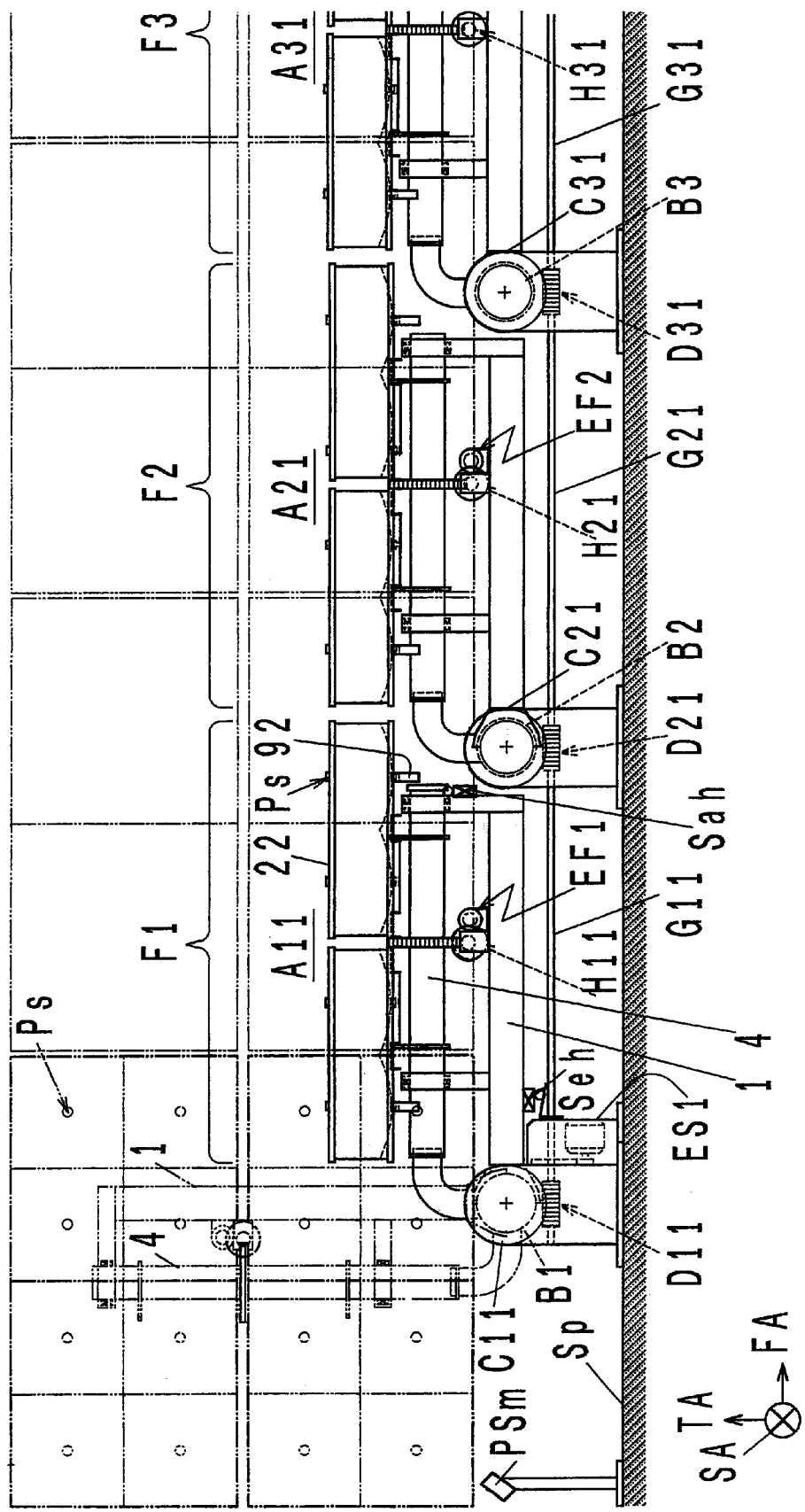
FIG. 3 is a left-hand side elevation, to an enlarged scale, of part of the embodiment shown in FIG. 1.

FIG. 1 illustrates that each support assembly Aij (i=1–4, j=1–4) supports four light collectors, which are indicated by numerals 21 to 24 for the assembly A11, illustrating the support assembly Aij in its collapsed position, which is a reference attitude for the assembly Aij, so that the light receiving surfaces of the respective light collectors lie parallel to the reference plane Sp. The same condition is shown in plan view of FIG. 2 where all of the light collectors are removed and indicated by thin phantom lines. A left-hand side elevation of the support assembly, as viewed in a direction indicated by an arrow SA from the left end as viewed in FIG. 1, is shown in FIG. 3. Referring to FIG. 2, the first shaft B1 in the first set comprises a hollow pipe, which is supported by four bearings C11 to C14 so as to be parallel to the reference plane Sp and rotatable about the axis thereof. The second shaft B2 to the fourth shaft B4 in the first set also each comprise a hollow pipe of the same size and same material as the shaft B1, and are each supported so as to be parallel to the reference plane Sp and rotatable about their respective axes by respective four bearings C21–C24, C31–C34 and C41–C44.

In a most preferred manner of use, the reference plane Sp represents a roof-top plane of a building where characters SA shown in the drawings represents an east-west axis pointing to the west, FA represents a south-north axis pointing to the north, and TA an up-down axis pointing to the sky. In this manner of use, the shafts B1–B4 in the first set represent elevational rotary shafts, and 4×4 shafts in a second set which extend in a direction orthogonal to the shafts B1–B4 or forming a T-configuration therewith and extending in the direction FA, such shafts associated with the assembly A11 being denoted by numeral 4, represent azimuthal rotary shafts.

When the embodiment shown in FIGS. 1 to 3 is mounted on the eastern wall of a building, the reference plane Sp is defined by the eastern wall while SA represents a south-north axis, FA an up-down axis and TA an east-west axis. When the embodiment shown in FIGS. 1 to 3 is mounted on a southern wall of a building, the reference plane Sp is defined by the southern wall where SA represents an east-west axis, FA an up-down axis and TA a south-north axis. Finally, when the embodiment shown in FIGS. 1 to 3 is mounted on the western wall of a building, the reference plane Sp is defined by the western wall where SA represents a south-north axis, FA an up-down axis and TA an east-west axis. It should be understood that if the wall is not correctly oriented to be horizontal, eastern, southern or western, any one of them can define the reference plane Sp as long as it represents a plane on which the solar beam can impinge. Accordingly, the embodiment shown in FIGS. 1 to 3 may be mounted on any such plane to receive the solar radiation by means of a light collector.

However, for the ease of understanding the invention, it is assumed in the description to follow that the character SA shown in the drawing represents an east-west axis, FA a south-north axis and TA an up-down axis. Thus, the shafts B1–B4 represent elevational rotary shafts, and 4×4 shafts in the second set (which is designated by numeral 4 for the assembly A11) extending in the direction FA represent azimuthal rotary shafts.

Figure 4:
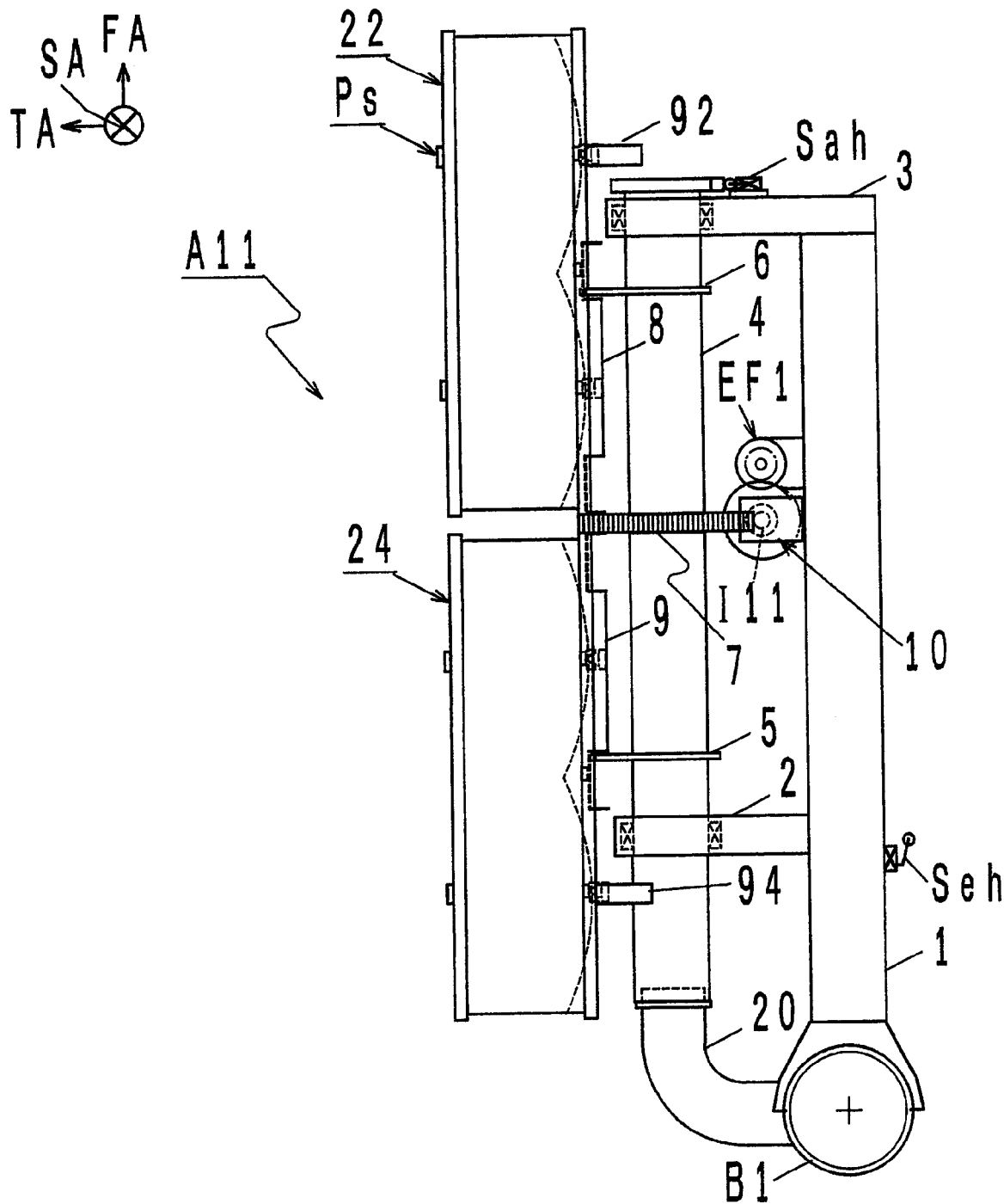
FIG. 4 is a left-hand side elevation, to an enlarged scale, of the support assembly A11 shown in FIG. 3.

FIG. 4 shows a first support assembly A11 in the first set which is disposed in a first row F1 and a first column S1 as viewed in FIGS. 1 to 3 to an enlarged scale. A stanchion 1 in the form of a square pipe is fixedly connected to the first shaft B1 in the first set. The first shaft 4 in the second set also comprises a hollow pipe, and is rotatably carried by arms 2, 3 through associated bearings while its axial movement is constrained. The arms 2, 3 are initially attached to support the shaft 4 and are then fixedly connected to the stanchion 1.

A curved duct pipe 20 has its one end fixedly connected to the shaft B1 while its other end extends into one end of the shaft 4. A pair of fixed plates 5, 6 and a wheel 7 are fixedly mounted on the shaft 4. The wheel 7 is located at an intermediate position on the shaft 4. Light collector support frames 8 and 9 are fixedly connected to the wheel 7 and the fixed plates 5,6 and each fixedly carries a pair of light collectors or a total of four light collectors 21–24.

Figure 5A:
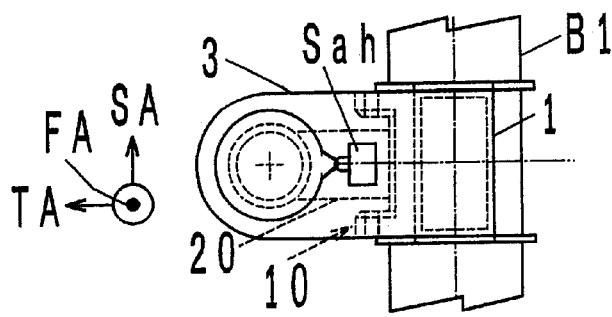
FIGS. 5*a*, 5*b* and 5*c* are a front view, a left-hand side elevation and a bottom view, respectively, of a mechanism which supports a shaft 4 (azimuth shaft) in a second set shown in FIG. 4.
Figure 5B:
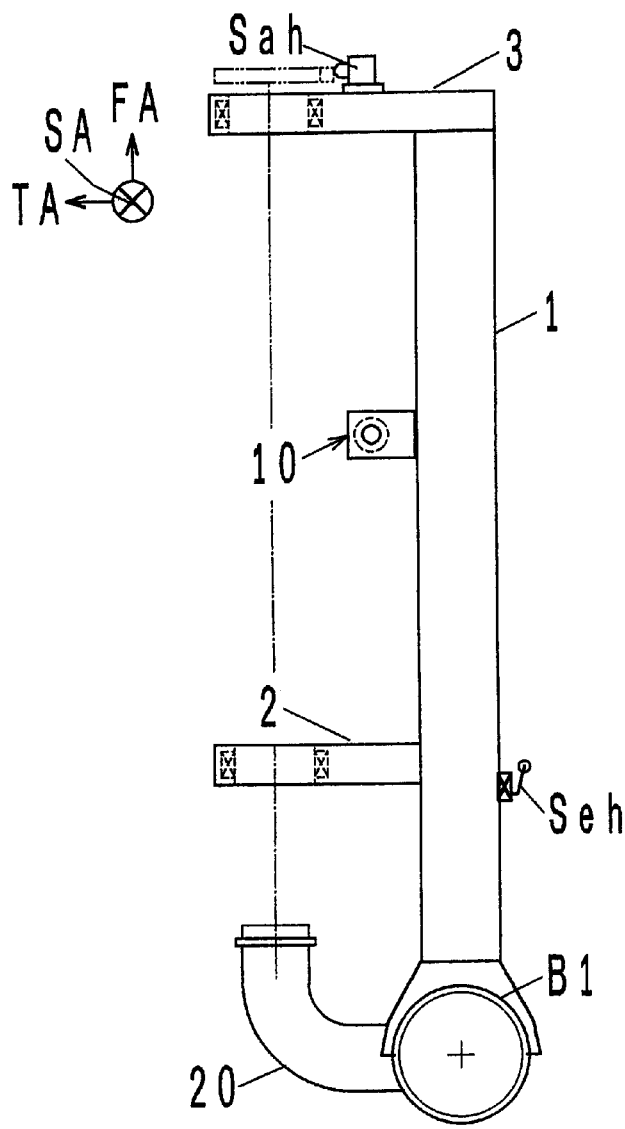
Figure 5C:
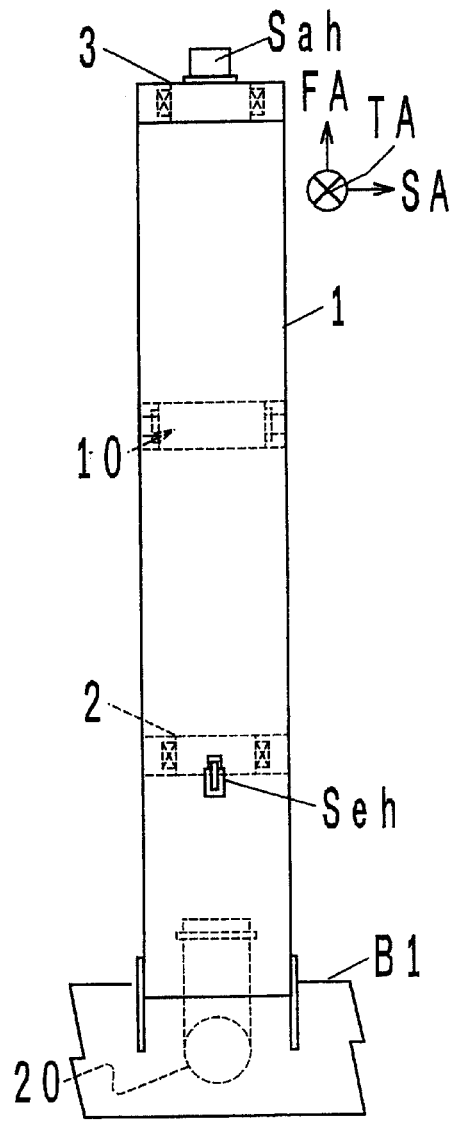

FIGS. 5a, 5b and 5c show a mechanism which supports the shaft 4 for rotation. These Figures show that the arms 2, 3 are already connected to the stanchion 1, but it should be understood that before the arms 2, 3 are fixedly connected with the stanchion 1, they are coupled with the shaft 4 in a manner to permit its rotation while disabling its movement along its axis thereof.

Figure 10A:
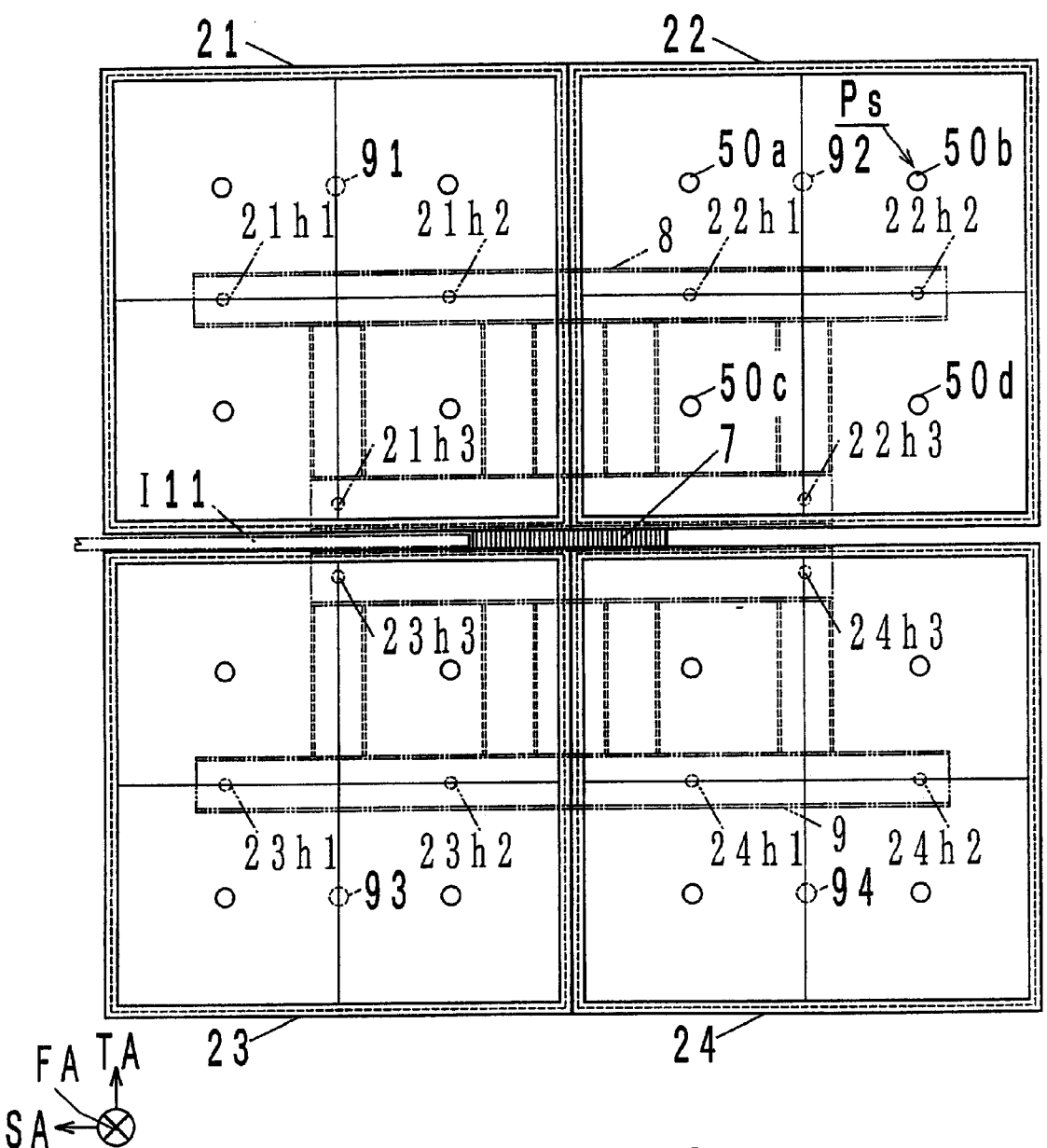
FIGS. 10*a* and 10*b* are a front view and a plan view illustrating light collectors 21–24 of a first embodiment which are mounted on the support frames 8, 9 shown in FIG. 6.
Figure 10B:
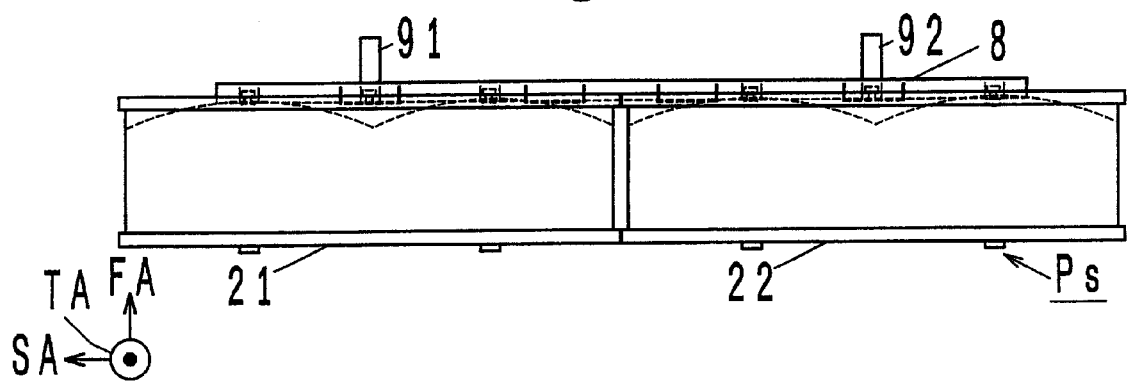

FIGS. 6a, 6b and 6c show a mechanism which fixedly carries the light collectors 21 to 24. It is to be noted that the support frames 8,9 are configured symmetrically to each other with respect to the wheel 7 which is disposed therebetween. Each of the support frames 8,9 is formed with three bolt holes per light collector or a total of six bolt holes $21h1$–$21h3$, $22h1$–$22h3/23h1$–$23h3$, $24h1$–$24h3$. Each of the light collectors 21 to 24 includes a bottom plate, to which three fixing bolts are hermetically secured by a welding operation, and these bolts may pass through the bolt holes mentioned above and engaged by nuts, which are then tightened, whereby the light collectors 21–24 are integrally secured to the support frames 8,9. A washer may be disposed on each fixing bolt in combination with a selected one of several rings having different thicknesses which permit a fine adjustment of inclination, which allows the relative attitude of one of the light collectors 21–24 with respect to the support frame 8 or 9 to be adjusted when they are tightened by the associated nut. The relative positions of the light collectors 21 to 24 mounted on the support frames 8,9 are shown in FIGS. 10a and 10b.

Returning to FIG. 4 and FIGS. 5a, 5b and 5c, a channel-shaped worm support frame 10 is fixedly mounted on the stanchion 1 at the location opposite to a toothed surface of the wheel 7, and serves rotatably supporting the worm 12 (FIG. 8) which is in meshing engagement with the wheel 7 while preventing its movement in the axial direction.

Figure 7:
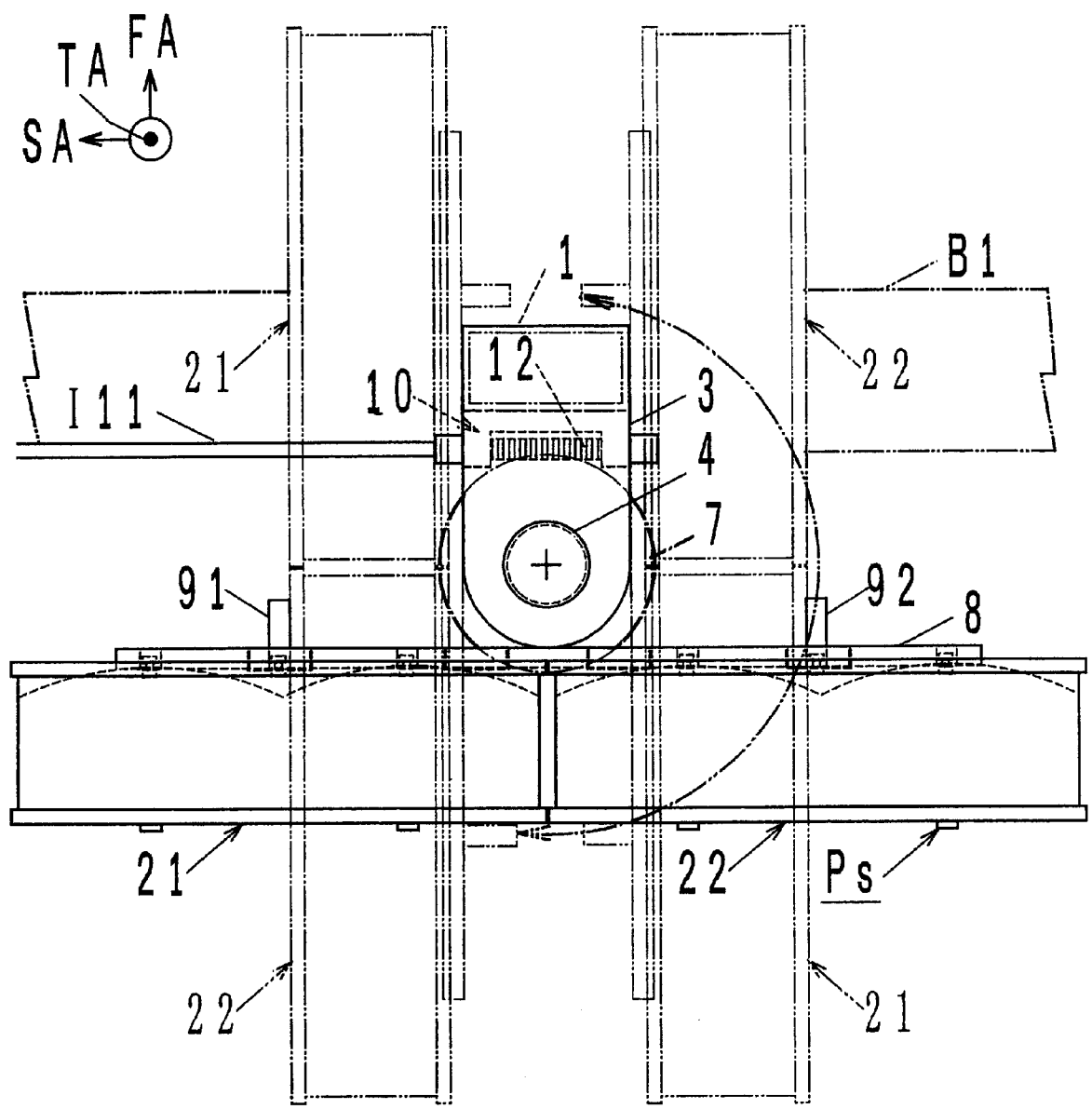
FIG. 7 is a plan view of a support mechanism for the support assembly A11 when the shaft 4 extends perpendicular to a reference plane Sp, as shown in thin phantom lines in FIG. 3, where SA may represent a east-west axis, FA a south-north axis and TA a vertical axis.
Figure 8:
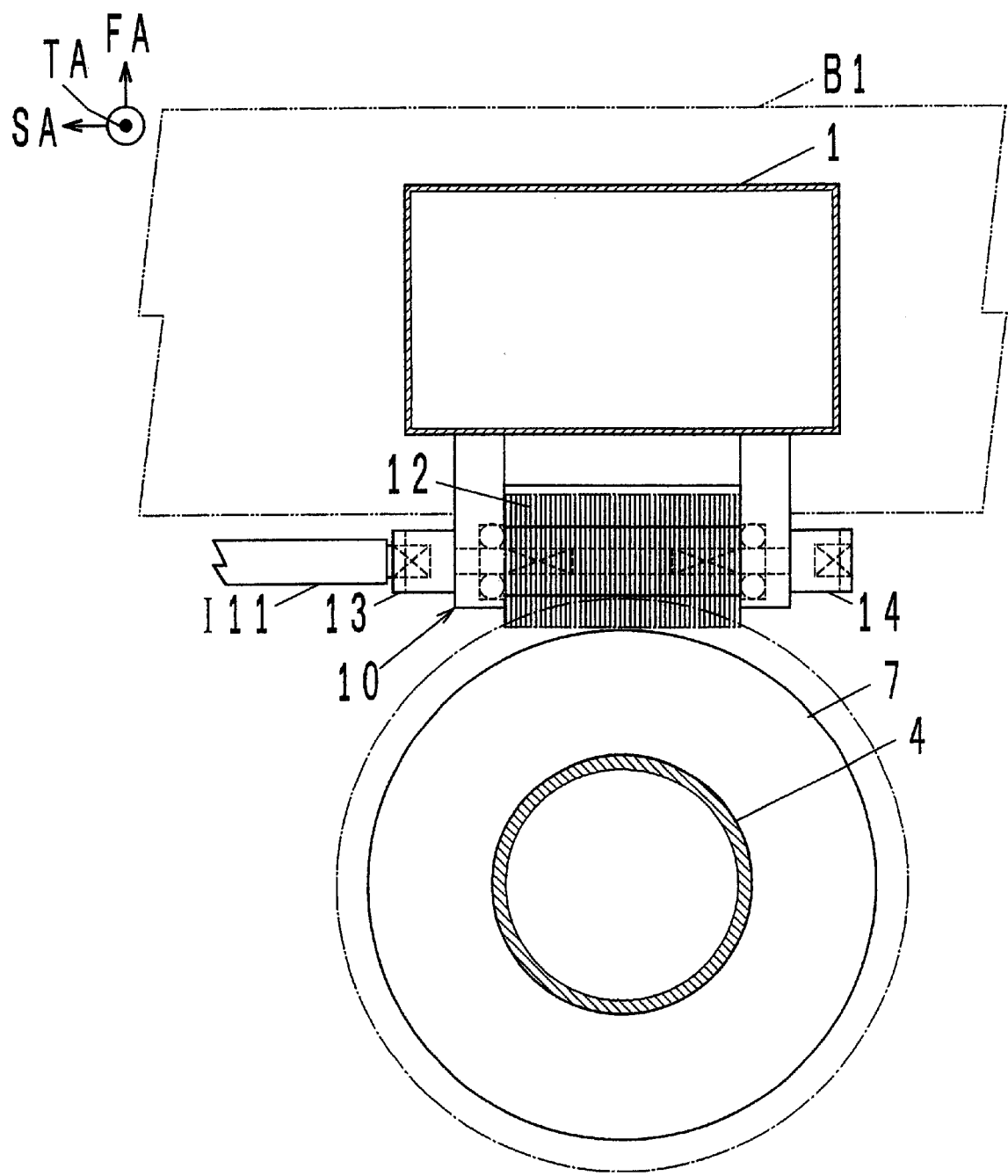
FIG. 8 is an enlarged plan view of a worm 12 which drives the shaft 4 shown in FIG. 7 for rotation about its axis, the stanchion 1 and the shaft 4 being shown in transverse or horizontal section.

FIG. 7 schematically shows a meshing engagement between the wheel 7 and the worm 12 while FIG. 8 shows them in further detail. Referring to FIG. 8, the worm 12 is centrally formed with square openings, in which square pillars at the ends of limbs of fasteners 13, 14 are a press fit. The fasteners 13, 14 are configured to be substantially in the form of a headed pin, with the neck in the limb thereof which is in the form of a round rod passing through the frame 10 and being rotatably supported by a bearing so that a square pillar at the end continuing from the neck is a press fit into the worm 12. Each of the fasteners 13, 14 is formed with a square opening in its head, and the square pillar at the end of the connecting rod I11 is fitted into the square opening formed in the fastener 13. Accordingly, as the connecting rod I11 turns, the associated fastener 13 and the worm 12 rotate in the similar manner, whereby the wheel 7 rotates. Accordingly, the shaft 4 which is integral with the wheel 7 rotates. Since the light collectors 21 to 24 are fixedly mounted on the shaft 4 through the support frames 8, 9 as shown in FIG. 4, the rotation of the shaft 4 causes the light collectors 21 to 24 to rotate about the shaft 4.

Figure 9A:
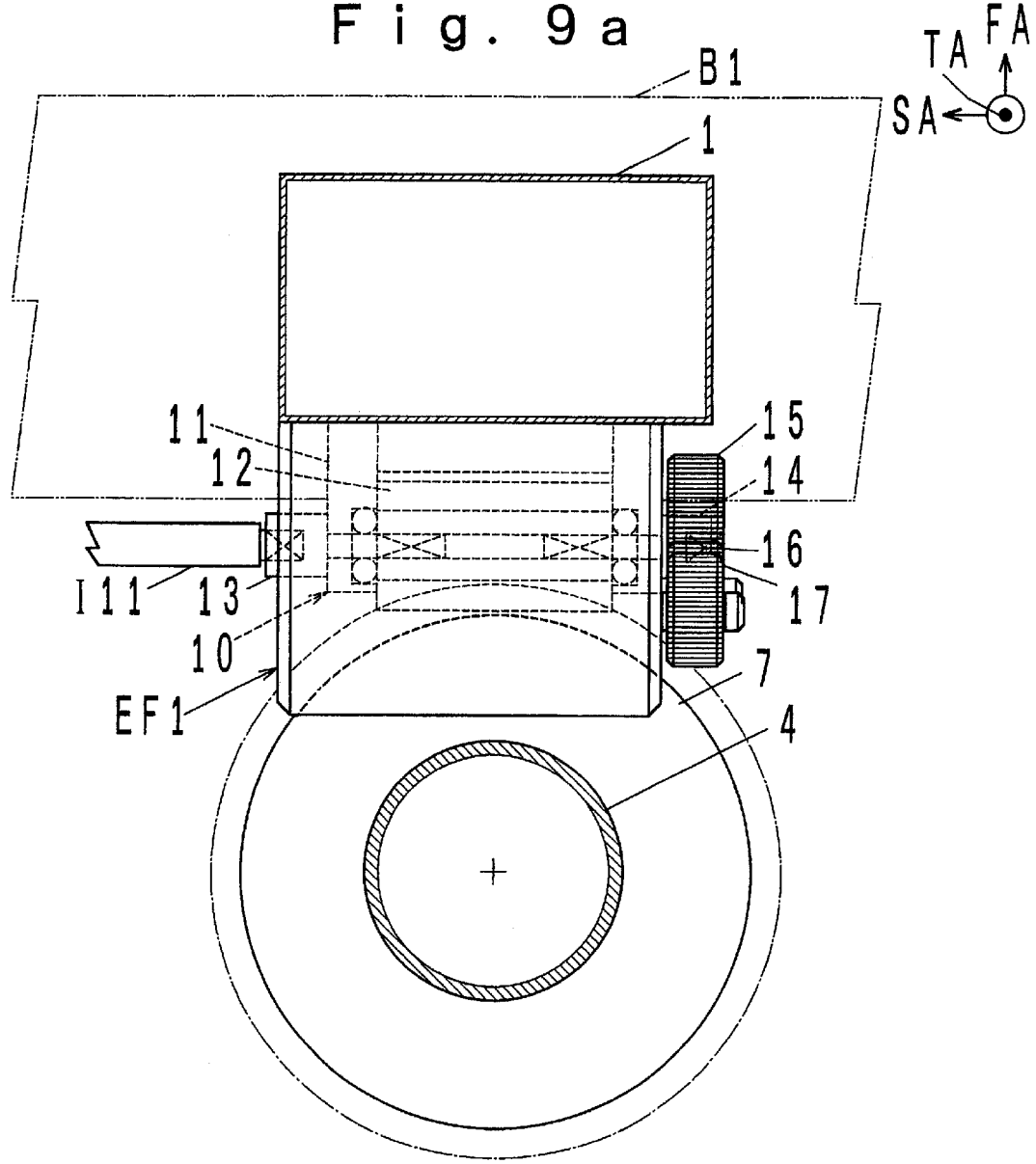
FIG. 9*a* is a plan view of a mechanism which drives the worm 12 shown in FIG. 8 for rotation, where the stanchion 1 and the shaft 4 are shown in transverse or horizontal section.
Figure 9B:
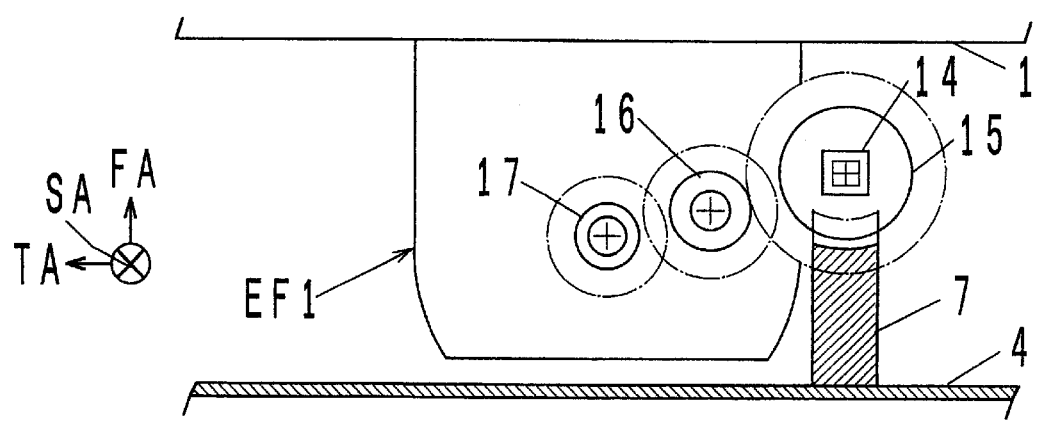
FIG. 9*b* is a longitudinal or vertical section of a mechanism which drives the worm 12 shown in FIG. 8 for rotation.

Referring to FIGS. 4 and 9a and 9b, a spur gear 15 of a large diameter is integrally and fixedly connected to the fastener 14, and is in meshing engagement with an intermediate gear 16, which is in turn in meshing engagement with a drive gear 17 that is fixedly mounted on an output shaft of a motorized drive mechanism EF1 internally housing a stepping motor and a reduction gearing. The motorized drive mechanism which is specifically shown in FIG. 9b is schematically shown in FIG. 4. It will be seen that the motorized drive mechanism EF1 is capable of driving the wheel 7 for rotation through the gears 17, 16 and 15, the fastener 14 and the worm 12. In this embodiment, the light collectors 21 to 24 can be driven for rotation through an angular range of about 180° about the shaft 4. Such rotation represents an azimuthal drive.

Returning to FIGS. 1 and 2, the first support assembly A11 in the first set which is located in the first row F1 and the first column S1 is supported by the first shaft B1 in the first set. Similarly, the second to the fourth assembly A12 to A14 in the first set which are located in the second to the fourth column S2 to S4, respectively, are supported by the first shaft B1 in the first set. However, the second to the fourth support assembly A12 to A14 lack the active drive element EF1, 15 to 17 which are provided in the first support assembly A11, but include worms which correspond to the worm 12 mentioned above and which are coupled to the worm 12 through connecting rods I11, I12 and I13 (FIG. 2) respectively so as to rotate simultaneously in the same direction and at the same speed as the worm 12. Consequently, the light collectors mounted on the second to the fourth support assembly A12 to A14 rotate simultaneously in the same direction and at the same speed as the light collectors 21 to 24 on the first support assembly A11. In this manner, a set of active drive elements EF1, and 15 to 17 which are provided in the first support assembly A11 is effective to provide an azimuthal drive of all the support assemblies A11 to A14 in the first set simultaneously.

Referring to FIG. 2, mechanisms H11, H21, H31 and H41 shown each within a double circle indicated in phantom lines represent azimuthal drive mechanisms which are provided with the active drive elements (EF1, 15 to 17) mentioned above while mechanisms H12 to H14, H22 to H24, H32 to H34 and H42 to H44 which are encircled in a single circle shown in phantom lines represent azimuthal drive mechanisms which are not provided with the active drive elements and which are only provided with follower mechanisms adapted to be driven for rotation by the worm through the connecting rods. Thus, the support assemblies A11, A21, A31 and A41 which are located in the first column S1 shown in FIG. 1 are provided with azimuthal drive mechanisms which contain active drive elements, but the support assemblies A12–A14, A22–A24, A32–A34 and A42–A44 which are located in the second to the fourth column S2 to S4 are azimuthal drive mechanisms which are only provided with follower mechanisms.

An elevational drive mechanism which drives the shafts B1 to B4 in the first set for rotation utilizes a combination of worms and wheels in the similar manner as in the azimuthal drive mechanisms. Referring to FIG. 2, the first shaft B1 in the first set fixedly carries a pair of wheels in meshing engagement with worms, which are rotatably supported by support stands D11, D12, which prevent a movement of the respective worms in the axial direction. Each of other shafts B2 to B4 also fixedly carries a pair of wheel in the similar manner, which are in meshing engagement with respective worms, which are in turn rotatably supported by support stands D21, D22/D31, D32/D41, D42, respectively, which prevent a movement of the respective worms in their axial directions. In the similar manner as in the azimuthal drive system, the worms which are supported by the respective support stands D11 to D41 are connected together by three connecting rods, one of which is shown at G11, so as to rotate simultaneously in the same direction and at the same speed. The worms which are supported by the support stands D12 to D42 are connected together by three connecting rods, one of which is shown at G12, to rotate simultaneously in the same direction and at the same speed.

Referring to FIGS. 2 and 3, the worm which is supported by the first support stand D11 in the first set is driven for rotation by a motorized drive mechanism ES1 internally housing a stepping motor and a reduction gear through a gear train, in the similar manner as the azimuthal mechanism shown in FIGS. 9a and 9b, whereby all the shafts B1 to B4 in the first set are driven for rotation simultaneously in the same direction and at the same speed. This constitutes the elevation drive. Because the single shaft such as shaft B1, for example, supports the four support assemblies (A11 to A14), there occurs an increased load for the elevation drives of all the shafts B1 to B4 in the first set. If all of the support assemblies A11 to A14 are supported in vertical positions, there would be a rotating effort of an increased magnitude caused by a wind pressure which is applied to the shafts B1 to B4, and therefore, there is a need to add an enhanced stop function which prevents the shafts B1 to B4 from rotating in such instance. To accommodate for this, in the present embodiment, another set of elevation drive mechanisms (D12–D42, ES2) which have a similar structure as the elevation drive mechanisms (D11–d41, ES1) mentioned above are coupled to all the shafts B1 to B4 in the first set to energize the two sets of elevation drive mechanisms simultaneously, as shown in FIG. 2.

It will be noted from FIG. 2 that a duct CAd, extending in the south-north direction (FA) between the bearing train which contains the bearing C12 and the bearing train which contains the bearing C13. In the present example, the purpose of light collectors 21–24 is to collect solar radiation and direct it into an optical fibre, as will be further described later, and the optical fibres connected to the light collectors extend through openings formed in the circumferential surface of the shaft 4 in the second set or the azimuth shaft into the internal space therein and then extends along the axes, to extend through the duct pipes 20 to enter the shaft (such as B1) in the first set to extend through the duct CAd to be assembled into a cable OFc. Thus, the optical fibre cable OFc extends through the duct CAd. All of the shafts B1 to B4 in the first set extend through the duct CAd in the lateral direction SA so as to be rotatable with respect to the duct CAd. To allow a bank of optical fibres which are branched from the optical fibre cable OFc to extend through all the shafts B1 to B4 in the first set, all of the shafts B1 to B4 are formed with lateral openings in regions which are located within the duct CAd which extend one-quarter the circumference or through 90° of the full perimeter of 360°. As mentioned previously, an extent of rotation for the elevation drive is defined as 90°, and the width of the opening, which is equal to one-quarter the circumference, is chosen to be coincident with this extent of rotation.

Referring now to FIGS. 3, 4 and 5a to 5c, in the present embodiment, the reference attitude of the light collectors is defined as a condition of the support assemblies A11 to A44 as shown in FIG. 3 where the light receiving surface of the light collectors 21 to 24 or the surface which faces the sun is parallel to both axes SA and FA or perpendicular to the axis TA or parallel to the reference plane Sp, and this represents the standby attitude. In this attitude, both the stanchion 1 and the shaft 4 are parallel to the axis FA. An angle of rotation of the shaft B1 assumed under this condition (or angle of elevation) is chosen to be +90° while an angle of rotation assumed by the shaft 4 or an angle of azimuth is chosen to be +90°, and both of these angular positions are referred to as home positions (HP). In the vertical upright condition of the stanchion 1 where it is parallel to the axis TA, as indicated by phantom lines 4 in FIG. 3, the angle of rotation (or the angle of elevation) of the shaft B1 is equal to 0°. In the vertical upright condition, the azimuth home position is reached where the angle of azimuth is equal to +90° when the light collectors 21 to 24 assume solid line positions in FIG. 7. When the light collectors 21 to 24 are rotated through 90° counter-clockwise, as viewed in FIG. 7, from the solid line position, the angle of azimuth becomes equal to 0°, and the light receiving surfaces of the light collectors 21 to 24 are perpendicular to the axis SA, thus facing eastward. When the light collectors 21 to 24 are rotated through 90° clockwise from the solid line positions, the angle of azimuth is equal to 180°, and the light receiving surfaces of the light collectors 21 to 24 are orthogonal to the axis SA, thus facing westward. In the present embodiment, the collapsed attitude of the support assemblies A11 to A44 as shown in solid lines in FIGS. 1 and 3 are chosen as the reference attitude, and are also chosen as the standby attitude because these attitudes are lowest in elevation, minimizing external forces as may be caused by wind or the like.

In order to detect whether or not the support assembly A11 assumes such reference attitude (or home position), a switch Seh for detecting an elevation HP is mounted on the stanchion 1 while a switch Sah for detecting an azimuth HP is mounted on the arm 3, as shown in FIGS. 3 and 4. The switch Seh is turned on when the angle of elevation is less than +90°, and is turned off when the angle is equal to or greater than +90°, indicating a collapsed attitude. In other words, this switch is turned off at the elevation HP. The switch Sah is turned on whenever the angle of azimuth is out of +90°, and is turned off when the angle is equal to +90°. In other words, this switch is turned off at azimuth HP.

The four light collectors 21 to 24 shown in FIG. 10a are supported by the support assembly A11. Interposed between the light collectors 21, 22 and 23, 24 is the wheel 7 as well as a clearance through which the connecting rod I11 can pass.

Figure 11:
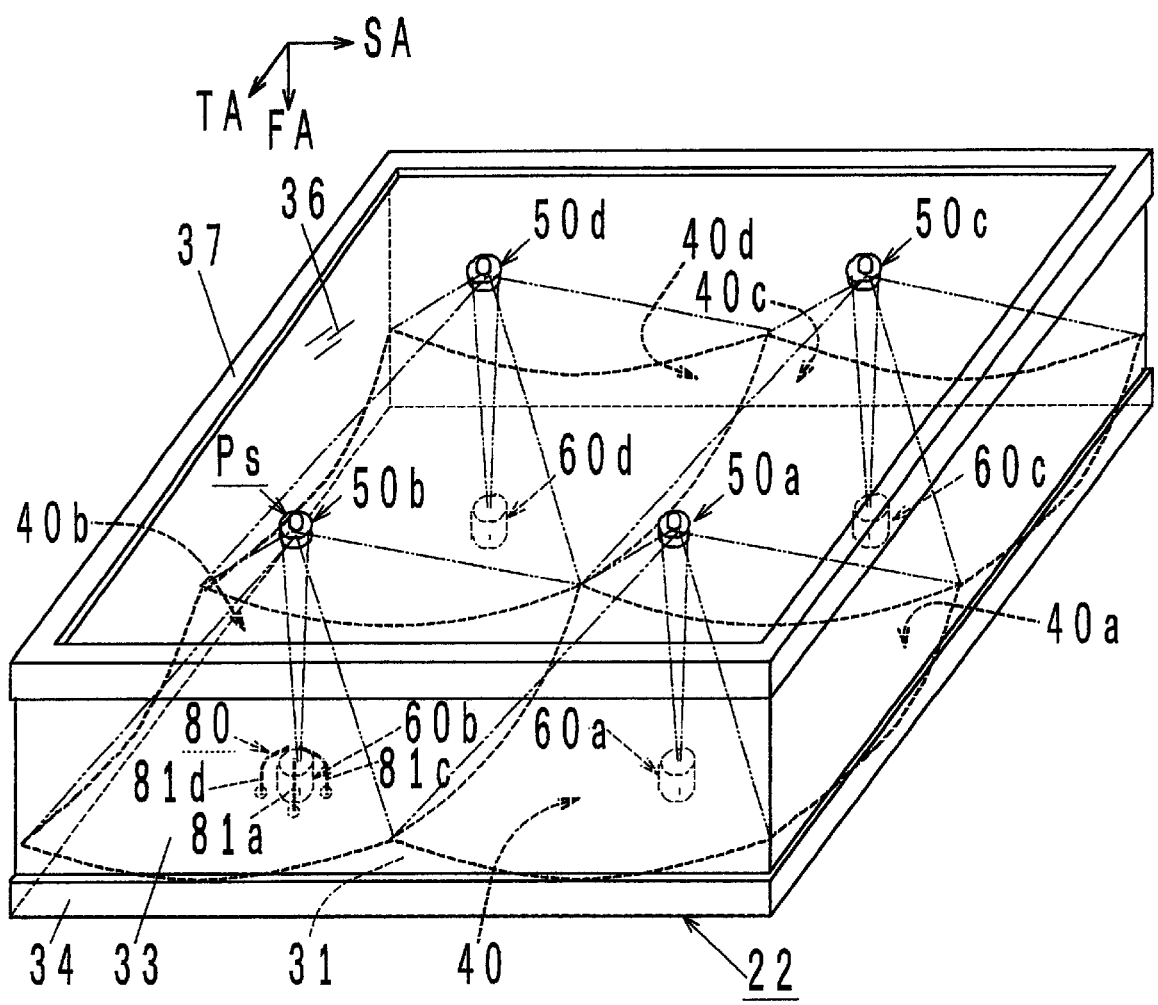
FIG. 11 is an enlarged, perspective view showing the appearance of the light collector 22 shown in FIG. 10*a*.

FIG. 11 shows the appearance of the light collector 22. The light collector 22 is substantially in the form of a hollow cube having a square opening which is closed by a light transmitting plate 36. The external surface of the light transmitting plate 36 acts as a light receiving surface or a surface exposed to the solar radiation. The cube internally contains a first set of mirrors 40 formed by four identical parabolic mirrors 40a, 40b, 40c and 40d which are sized and configured to exhibit a focal length less than a depth of the cube and which are formed integrally and contiguously by a press operation of a metal sheet, a polishing and an electroplating operation. Lighting units 60a, 60b, 60c and 60d are disposed at the center of individual parabolic mirrors 40a, 40b, 40c and 40d, respectively, and a second set of reflectors 50a, 50b, 50c and 50d which are fixedly mounted on the light transmitting plate 36 are disposed toward the foci of the parabolic mirrors 40a, 40b, 40c and 40d, respectively.

Figure 12:
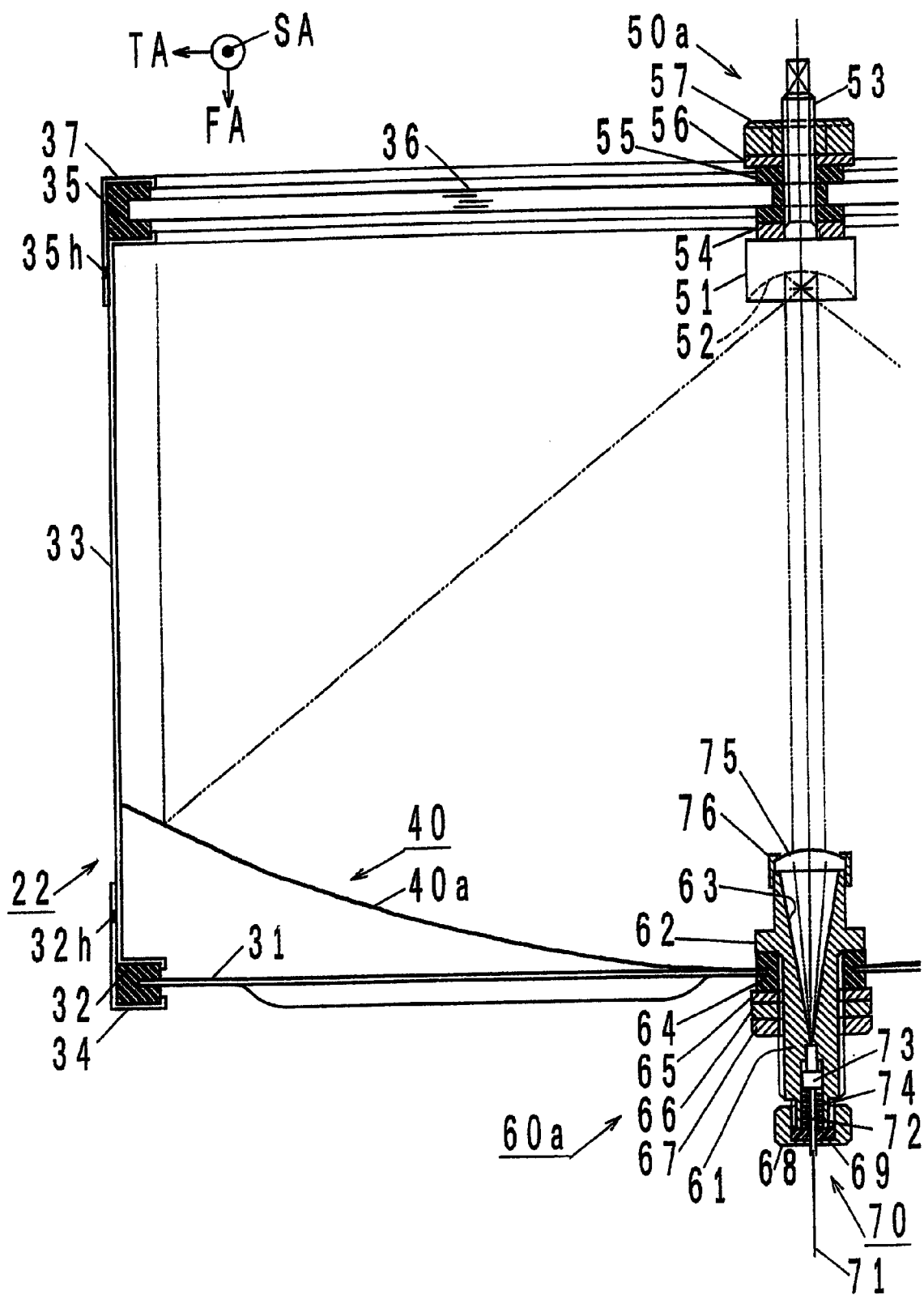
FIG. 12 is an enlarged longitudinal section of a reflector 50*a* and a lighting unit 60*a* shown in FIG. 11.

FIG. 12 shows an FA-TA cross section at the location of the reflector 50a shown in FIG. 11. Referring to FIGS. 11 and 12, it will be seen that a minimum unit of light collector is formed by a combination of the parabolic mirror 40a, the lighting unit 60a disposed at the central position of the mirror 40a, and the reflector 50a in the second set which reflects light reflected by the parabolic mirror 40a toward the lighting unit 60a in a fold-back manner. As shown in FIG. 11, a single light collector comprises four such light collector units, and each of the support assemblies A11 to A44 support a combination of such four light collectors in a manner indicated in FIG. 10a.

With continued reference to FIGS. 11 and 12, circular openings are formed at the center position of the respective parabolic mirrors 40a to 40d of the first set for allowing the lighting units 60a to 60d to be mounted therein. Circular openings which are aligned with these circular openings are formed in the bottom plate 31 of the light collector 22, and a bushing 64 is a press fit into the circular openings formed in the bottom plate 31 and the mirror 40 to provide a highly heat resistant hermetic seal. A lighting sleeve 61 extends through a bore in the bushing 64 and has a flange 62 which is disposed within the light collector to abut against the bushing 64. The lighting sleeve 61 includes a shank extending through the bushing 64 to the outside of the light collector where the sleeve is formed with a male thread of a large diameter extending through a washer 65, a fixing nut 66 and a lock nut 67, which are disposed for abutment against the bushing 64. As the fixing nut 66 is screwed around the male thread on the lighting sleeve 61, the bushing 64 is held sandwiched between the flange 62 of the lighting sleeve 61 and the washer 65 and thus is compressed therebetween. Such manner of holding the bushing 64 sandwiched may be insufficient to provide a hermetic seal for the lighting unit, and in such instance, a heat resistant sealant may be previously applied to the internal and the external surface of the bushing 64 before mounting the lighting unit in place. After tightly screwing the fixing nut 66, the lock nut 67 is screwed in order to prevent unscrewing thereof.

The lighting sleeve 61 is internally formed with a conical opening, presenting a conical surface 63 which is a mirror finish. A light focusing lens 75 is fitted into the inner opening located inside of the light collector and is retained in place by a cap 76. The bottom of the conical opening corresponding to the apex of the once reaches the bottom surface of a circular opening which is adapted to receive the front end of a ferrule 73, presenting an opening which is slightly less than the effective light admitting cross section of an optical fibre 71 at the bottom surface. The optical fibre 71 is disposed inside a seamless stainless steel pipe 72 of a high air tightness, which pipe 72 is secured to the ferrule 73 and the front end of the optical fibre 71 is secured to the ferrule 73 so that the front end face thereof is located centrally in the front end face or the light receiving end of the ferrule 73. In order to assure the air tightness of the internal space within the light collector 22, the ferrule 73 is internally filled with hermetic seal material in a region between the optical fibre 71 and the inner surface of the seamless stainless steel pipe 72. While the stainless steel pipe 72 is shown cut to expose the optical fibre 71 in FIG. 2, it should be understood that the optical fibre 71 is contained within the stainless steel pipe 71 throughout its entire length except at its end located within the ferrule.

The stainless steel pipe 72 which protects the optical fibre 71 extends through a retainer cap nut 68 and through a rubber disc 69 which is disposed as a press fit therein to provide a hermetic seal. A coiled compression spring 74 is interposed between the rubber disc 69 and the ferrule 73, and the cap nut 68 has a female thread which receives a male thread formed around the end of a reduced diameter of the lighting sleeve 61. By tightening the cap nut 68, the coiled compression spring 74 urges the front end face of the ferrule 73 into abutment against the bottom surface of a circular, ferrule receiving opening formed in the lighting sleeve 61 and also urges the rubber disc 69 against the outer end face of the lighting sleeve 61 to cause it to abut against the pipe 72, thus closing the outer end face of the lighting sleeve 61 in the hermetically sealed manner.

The optical fibre assembly 70, that is, the combination of the optical fibre 71 and the pipe 72, is coupled to the lighting unit 60a to 60d in the manner illustrated in FIG. 12 after the support assemblies A11 to A44 are installed at a given position such as on the roof-top of a building, for example, and the light collectors 21 to 24 are mounted thereon. However, before the optical fibre assembly 70 is coupled to the lighting unit 60a to 60d, a cap nut which is similar to the cap nut 68, but which is associated with a rubber disc 69 that is not formed with an opening for passing a pipe therethrough is threadably engaged with the outer end of the lighting unit 61 to close the outer opening of the lighting sleeve 61 in order to isolate the internal space within the light collector from the outer atmosphere to maintain a hermetic seal.

The light transmitting plate 36 is formed with a circular opening at a position which is intersected by the center axis of the lighting sleeve 61, and a weatherproof bushing 55 is disposed as a press fit in the circular opening to provide a hermetic seal. A second set of reflectors 50a include a compact mirror 51 for each reflector, having a threaded shank 53 which extends through a central bore formed in the bushing 55 from within the light collector to the outside thereof. The compact mirror 51 is in the form of a bolt having a solid cylindrical screw head of an increase size, and a parabolic mirror 52 of a reduced diameter is formed in the head of the bolt.

The focus of the parabolic mirror 52 is approximately located at the focal position of the parabolic mirror 40a, and accordingly, when the optical axis of the parabolic mirror 40a is properly aligned with the path of the solar beam or when the parabolic mirror 40a is correctly directed toward the sun, the light which is reflected by the parabolic mirror 40a is focused to its focus where it is reflected by the parabolic mirror 52 as a collimated beam to the lens 75. In this instance, the distance between the parabolic mirror 40a and the central position of the parabolic mirror 52, or inter-mirror distance, is equal to a reference distance which is equal to the sum of the focal length of the parabolic mirror 40a and the focal length of the parabolic mirror 52. When an inter-mirror distance is less than the reference distance, a light beam which is reflected by the parabolic mirror 52 toward the lens 75 will be fanning. Conversely, if the inter-mirror distance is greater than the reference distance, the light beam will be tapered.

If the light beam which is reflected by the parabolic mirror 52 can be substantially focused to the position which is located at the apex of the conical mirror surface 63 or immediately before or after the apex position without the provision of the lens 75, the lens 75 can be dispensed with. However, it is preferred to provide the lens 75 in order to assure a high efficiency of lighting if the mirror finish applied to the parabolic mirrors 40a and 52 is of a reduced accuracy.

The threaded bolt shank 53 of the compact mirror 51 extends through an inner washer 54, the bushing 55, an outer washer 56 and a fixing nut 57, and when the fixing nut 57 is tightened around the threaded shank 53, the bushing 55 can be compressed to provide a hermetic seal between the threaded shank 53 and the light transmitting plate 36. If required, a lock nut may be engaged with the threaded shank 53 to hold the fixing nut 57 in place.

A hermetic seal frame 32 is applied to an end of the bottom plate 31 of the light collector 22. A square sleeve 33 and a fixing frame 34 in the form of a square ring are disposed on the opposite sides of the frame 32 to compress it in the direction of thickness of the bottom plate 31, and while maintaining such condition, a plasma spot welding is applied to secure the fixing frame 34 to the square sleeve 33, thus securing the bottom plate 31 and the square sleeve 33 together in a hermetically seal manner. A hermetic seal frame 35 is also applied to the light transmitting plate 36, and is compressed in the direction of the thickness of the light transmitting plate 36 while it is held between the square sleeve 33 and a fixing frame 37 in the form of a square ring to allow a plasma spot welding to secure the fixing frame 37 to the square sleeve 33. In this manner, the light transmitting plate 36 and the square sleeve 33 are secured together in a hermetically seal manner. It is to be noted that the fixing frames 34 and 37 are previously formed with circular openings 32h and 35h, respectively, at positions where the spot welding operation is applied, so that when a plasma jet sprayed from a plasma torch is applied, the edges of the circular openings 32h and 35h are melted to be fused to the square sleeve 33.

It will be understood that light collectors 21, 23 and 24 in the first set other than the light collector 22 as well as all the light collectors supported by the remaining support assemblies A12 to A14, A21 to A44 include four of the light collector unit shown in FIG. 12 comprising the parabolic mirror 40a, the lighting unit 60a and the reflector 50a. The light collector 22 is similarly provided with four light collector units, but it also comprises a bank of lighting rods 80 which are effective to detect a misalignment of the light collector 22 which is to be oriented toward the sun, and this will be described with reference to FIG. 13.

Figure 13:
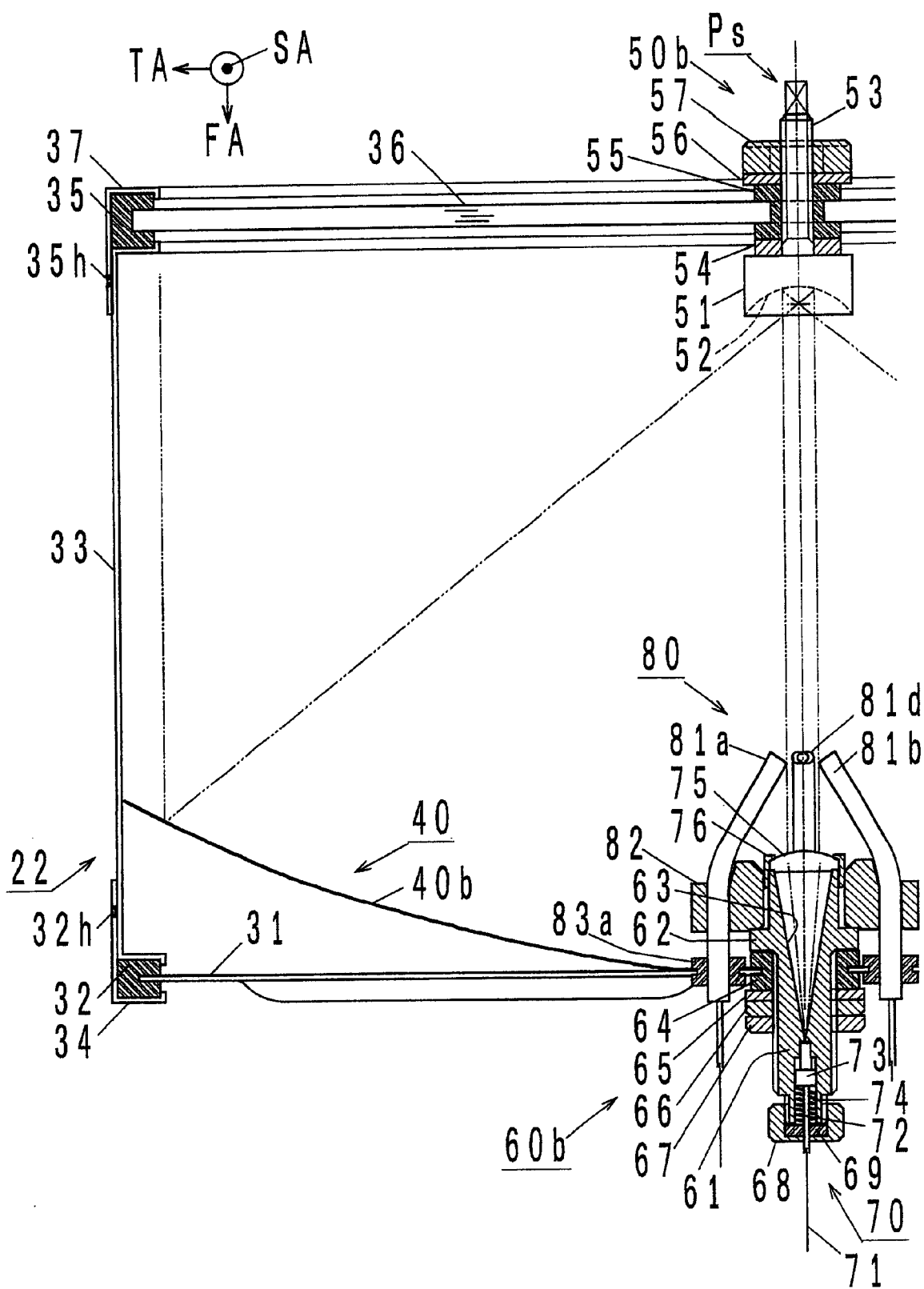
FIG. 13 is an enlarged longitudinal section of a reflector 50*b* and a lighting unit 60*b* shown in FIG. 11.

Referring to FIGS. 11 and 13, four curved or chevron-shaped stainless steel pipes 81a to 81d are distributed symmetrically as centered about the center axis of the lighting unit 60b, and are maintained by a ring-shaped holder 82. These pipes 81a to 81d extend through respective bushings 83a which in turn extend through the bottom plate 31 and the parabolic mirror 40a in a hermetically sealed manner, thus extending to the outside of the light collector. An optical fibre assembly which is similar to the optical fibre assembly 70 and which is provided with a ferrule on its front end face is inserted into each of the pipes 81a to 81d with the ferrule side inserted first, whereby the front end face or the light receiving surface of the ferrule is located at the front end face of each pipe 81a to 81d which is disposed within the light collector. The interior of the stainless steel pipes and the openings at the tail ends of the pipes 81a to 81d of the optical fibre assembly which are located outside the light collector are filled with a sealant.

When the light collector 22 is properly oriented toward the sun or when the sun is located on an extension of the center axis of the lighting unit 60b, the front end faces of the pipes 81a to 81d will be located behind the compact mirror 51, and accordingly, the direct beam from the sun can not reach them. These end faces are also located outside the light beam which is reflected by the parabolic mirror 52 within the compact mirror 51 toward the lens 75, and thus can not accept such light beam. However, in the morning when the tracking of the light collector 22 with respect to the motion of the sun is lagging in the elevation direction, the light beam approaches the front end face of the pipe 81a, which therefore gains in the amount of light which it receives. At this time, the amount of light received by the front end face of the pipe 81b, which forms a pair with the pipe 81a, will diminish. On the contrary, when the elevation tracking of the light collector 22 is advanced with respect to the sun, and in the afternoon when the tracking of the motion of the sun by the light collector 22 is lagging in the elevation direction, the situation will be opposite from what is mentioned above.

When the tracking of the motion of the sun by the light collector 22 is lagging in the azimuth direction, the light beam will approach the front end face of the pipe 81c, which therefore gains in the amount of light which it receives. At this time, the amount of light received by the front end face of the pipe 81d will diminish. When the azimuth tracking by the light collector 22 is advanced relative to the sun, there occurs an opposite result.

The location where the bank of lighting rods 80 which serves detecting a misalignment of the light collector 22 is indicated at Ps in FIGS. 1, 3, 4, 7, 10a, 11 and 13.

If a moisture is present within the light collector 21 to 24, there appears a fog on various surfaces within the light collector under a low temperature condition, or a dew forms. The optical fibre 71 is a quartz fibre, and if a moisture exists at the end face thereof and becomes hotter as a result of impingement of a high density light beam which is collected by the lens 75 thereon, the end face of the fibre will become lactescent, thus producing a degradation. In addition, the dew causes stains to the mirror surface. Light impinges on the mirror 40 with a density which is substantially equal to the density of the natural solar radiation, and therefore, the occurrence of stains on the mirror 40 cannot cause a premature wear of the mirror 40. However, if high density light which is focused by the parabolic mirror 40a impinges upon the parabolic mirror 52 to produce stains thereon, the light loss or a degradation in the photo-thermal conversion rapidly rises thereat, causing it to assume a higher temperature, which in turn accelerates the growth of stains, thus causing a rapid degradation of the parabolic mirror 52. To accommodate for this, the internal space within the light collectors 21 to 24 is isolated from the outer atmosphere and is maintained in its hermetically sealed condition, and a moisture-free gas such as dry air or moisture-free inert gas is confined into the internal space. To facilitate this, a valve unit 92 is fitted (FIGS. 4, 7, 10a and 10b) in the bottom plate 31 of the light collector 21.

Figure 14A:
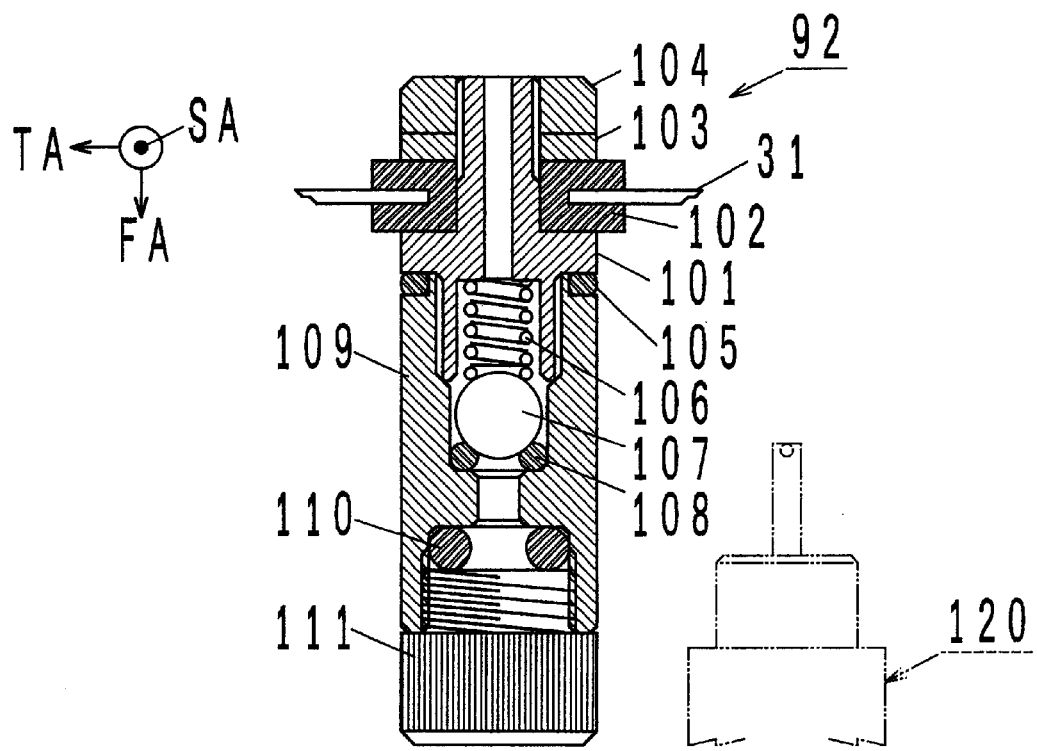
FIGS. 14*a* and 14*b* are enlarged longitudinal sections of a valve unit 92 mounted in the bottom plate 31 of the light collector 22 shown in FIG. 11, FIG. 14*a* illustrating a closed valve condition in which the internal space of the light collector is closed and FIG. 14*b* illustrating an open valve condition in which a mouthpiece 120 is mounted for discharge of gas from the internal space of the light collector 22 or for injection of a moisture-free air or inert gas into the internal space.

FIG. 14a shows the valve unit 92 in an enlarged longitudinal section. A bushing 102 is disposed as a press fit into a circular opening formed in the bottom plate 31. A trunk 101 has a sleeve limb formed with a male thread, and extends through the bushing 102, a washer 103 and a fixing nut 104 which are placed on top of the bushing 102. By threadably engaging and tightening the fixing nut 104 with the sleeve limb, the bushing 102 is compressed between a flange of the trunk 101 and the washer 103, whereby the bushing 102 provides a hermetic seal between the bottom plate 31 and the trunk 101. The trunk 101 is formed with a circular opening of an increased diameter outside the light collector, and a coiled compression spring 106 is received in the circular opening. The trunk 101 is also formed with a male thread at a location outside the circular opening, which is engaged by a female thread formed around a valve seat sleeve 109. An O-ring 105 is interposed between the flange of the trunk 101 and the end face of the valve seat sleeve 109, and can be compressed by tightening the valve seat sleeve 109. In this manner, the O-ring 105 provides a hermetic seal between the trunk 101 and the valve seat sleeve 109.

Another O-ring 108 and a ball 107 are disposed inside the valve seat sleeve 109, and the ball 107 is urged by the coiled compression spring 106 to abut against the O-ring 108, whereby the internal space within the valve seat sleeve 109 is isolated at a point which is intermediate its length (a closed valve condition). The valve seat sleeve 109 is formed with a gas feed/discharge port which is formed with a female threaded bore of an increased diameter, in which O-ring 110 is inserted, thus normally closing the gas feed/discharge port by means of a closure screw 111. The closure screw 111 slightly compresses the O-ring 110 to prevent an ingress of an outer atmosphere into the internal space within the light collector or a leak of a gas from the internal space to the outer space, but has for its principle purpose to prevent an ingress of dust into the valve seat sleeve 109.

Figure 14B:
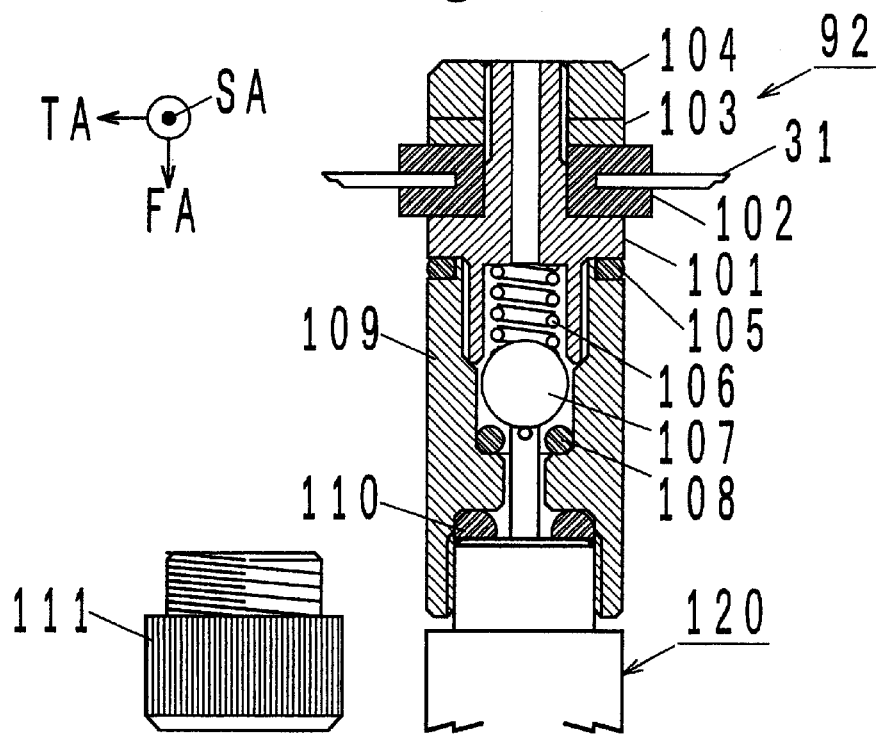

For extracting any gas from within the light collector to the outside and when injecting dry air or moisture-free inert gas into the light collector, a feed/discharge mouthpiece 120 is used. At its front end, the mouthpiece 120 is formed with a sleeve-shaped pin with an opening, which communicates with an open/close valve disposed in the other end of the mouthpiece, not shown, the valve being connected through a two-way switching valve, to be selectively connected to a negative pressure (suction) or positive pressure (dry air or moisture-free inert gas at a pressure higher than the atmospheric pressure). When the closure screw 111 is removed from the gas feed/discharge port of the valve seat sleeve 109, and the mouthpiece 120 is inserted into the gas feed/discharge port of the valve seat sleeve 109, as indicated in FIG. 14b, the O-ring 110 is initially compressed, and the ball 107 is removed from the O-ring 108 as urged by the sleeve-shaped pin on the end of the mouthpiece 120 (open valve condition). Under this condition, the two-way switching valve is connected to the negative pressure and the open/close valve may be opened, whereupon any gas contained in the internal space of the light collector is rapidly discharged. When the pressure of the internal space is sufficiently reduced, the two-way switching valve is switched to the positive pressure, whereupon the dry air or moisture-free inert gas can be rapidly fed into the light collector. When the positive pressure is saturated at a given pressure, the open/close valve is closed, and the mouthpiece 120 is removed from the gas feed/discharge port of the valve seat sleeve 109. Then the ball 107 is initially brought into abutment against the O-ring 108 to close the valve, and subsequently the end face of the mouthpiece is removed from the O-ring 110. In order to prevent an ingress of dust or water into the valve seat sleeve 109, the gas feed/discharge port of the valve seat sleeve 109 is closed by the closure screw 111.

A valve unit, which is identical in construction to the valve unit 92 mentioned above, is similarly fitted in all of the light collectors. All of the support assemblies A11 to A44 are arranged in a manner illustrated in FIG. 2, and a subset of four light collectors is mounted in each of the support assemblies A11 to A44. The cap nut, not shown, which closes the ferrule receiving opening of the lighting sleeve 61 in a hermetically seal manner is removed, and the ferrule 73 located at the front end of the optical fibre assembly 70 which is branched from the optical fibre cable OFc within the duct CAd to extend through the elevation shafts B1 to B4 and the azimuth shaft 4 is inserted into the opening, whereupon the ferrule receiving opening is closed by the cap nut 68 in a hermetically sealed manner as shown in FIG. 12. Subsequently, a negative pressure is applied to discharge any gas from within the light collector, and then a positive pressure is applied to inject dry air or moisture-free inert gas into the light collector, thus filling the internal space of the light collector with either dry air or moisture-free inert gas which assumes a pressure higher than the atmospheric pressure. In this manner, a dew is prevented from being formed within the light collector while simultaneously preventing an ingress of moisture-laden air into the light collector from the outside.

Referring back to FIGS. 1 and 3, the stanchion is erected on the reference surface (such as a roof-top plane of a building (Sp)), and a photosensor PSm facing the east-south and oriented at an angle of about 45° upward and which is thus highly sensitive to the a.m. solar radiation as well as another photosensor PSn facing south-west and oriented at an angle of about 45° upward and which is thus highly sensitive to the p.m. solar radiation are mounted on the stanchion. The both sensors PSm, PSn receiver substantially an equal amount of light when the solar radiation impinges on the first set of shafts B1 to B4 in a direction orthogonal thereto.

Figure 15:
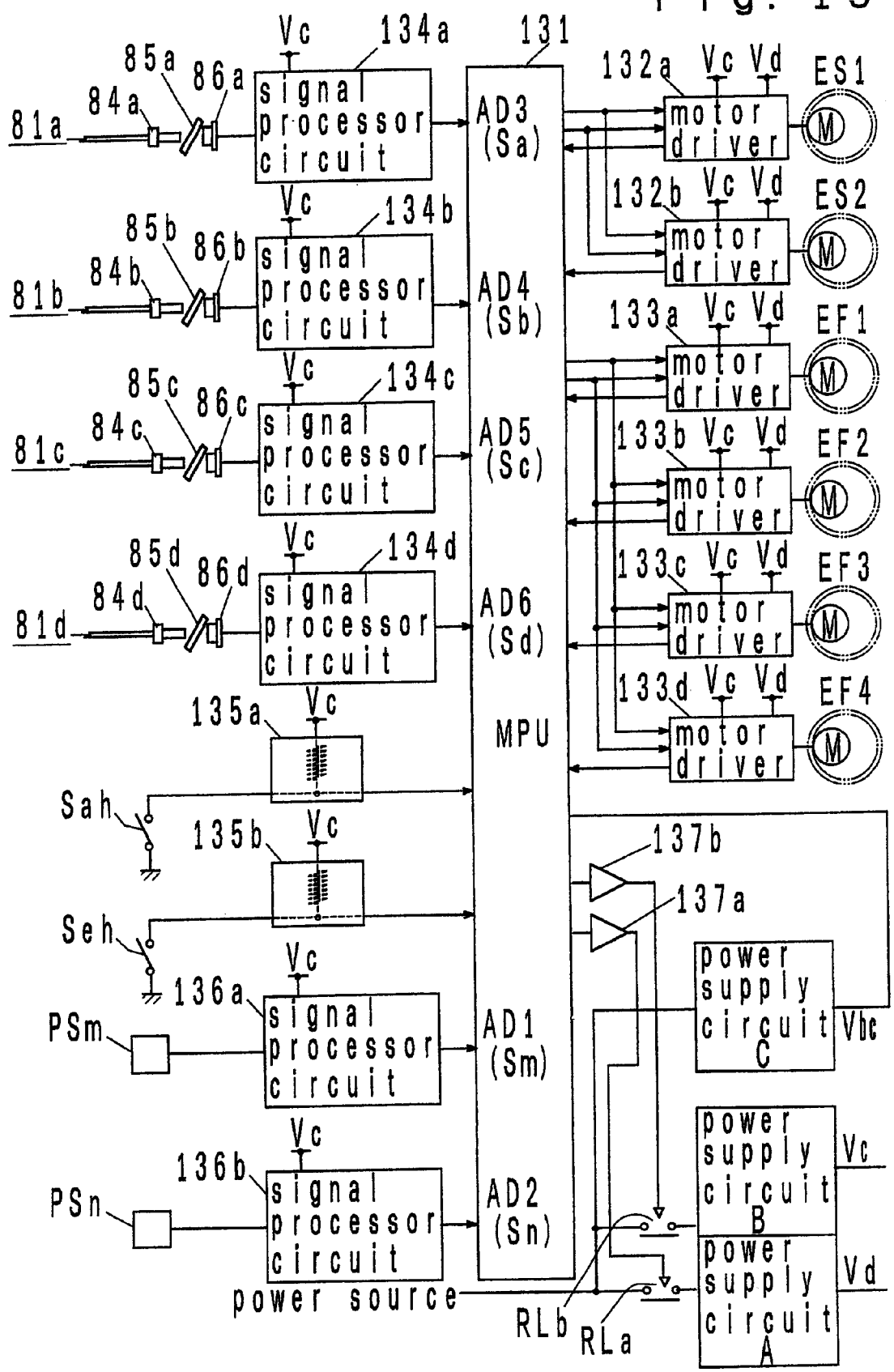
FIG. 15 is a block diagram of an electrical control system which is associated with the supporting apparatus shown in FIG. 1 for tracking the sun.

FIG. 15 shows a general arrangement of an electrical control system for the light collector system mentioned above. The electrical control system essentially comprises a microcomputer (hereafter abbreviated as MPU) 131, which is a CPU system including a CPU, a program ROM and RAM.

The photosensors PSm, PSn are connected to signal processor circuits 136a, 136b, which produce light detection signals in the form of analog voltages which represent the respective amount of light received by the photosensors PSm, PSn, which signals are applied to A/D conversion input ports AD1, AD2 of MPU 131. It is to be noted that these light detection signals have levels or voltage values which are substantially equal to each other when the solar radiation impinges upon the first set of shafts B1 to B4 in a direction orthogonal thereto. MPU 131 performs a digital conversion of the light detection signals from the ports AD1, AD2, reads the digital values, and compares the levels against each other to determine whether it is now in the morning or in the afternoon. In the description to follow, the amount of light detected by the photosensor PSm, representing data obtained as a result of the digital conversion is denoted as Sm while the amount of light detected by the photosensor PSn will be denoted by Sn.

Light radiated from the end of each ferrule 84a to 84d shown in FIG. 15, which correspond to the detected light output from the respective optical fibre assemblies which are inserted into the stainless steel pipes 81a to 81d in the bank of lighting rods 80 shown in FIGS. 11 and 13 are attenuated by half mirrors 85a to 85d before impinging upon photosensors 86a to 86d. Each photosensor 86a to 86d is connected to one of signal processor circuits 134a to 134d, which in turn deliver light detection signals representing the amount of light from the front end face of the individual stainless steel pipes 81a to 81d. These light detection signals are fed to A/D conversion input ports AD3 to AD6. MPU 131 effects a digital conversion of the light detection signals from the input ports AD3 to AD6, reads them, and determines any lag or advance in the orientation of the light collectors as the latter track the motion of the sun on the basis of the levels of these light detection signals. The amount of light received by each of the pipes 81a to 81d, which is indicated by data obtained by the digital conversion, will be denoted as Sa, Sb, Sc and Sd.

A constant voltage Vc is applied to the azimuth HP detecting switch Sah and the elevation HP detecting switch Seh through pull-up resistors 135a, 135b, and the potential of each switch is applied to MPU 131. When the support assemblies A11 to A44 are located at the azimuth HP, the switch Sah is turned off, delivering a high potential H to MPU 131. When the support assemblies A11 to A44 are in the elevation HP, the switch Seh is turned off, delivering a high potential H to MPU 131. When the support assemblies A11 to A44 are in their reference attitude (namely, in their collapsed attitude shown in FIGS. 1 to 3, assuming both azimuth HP and elevation Hp), the both switches are turned off, delivering a high potential H to MPU 131.

A first set of drive means or elevatory drive means ES1, ES2 and a second set of drive means or azimuth drive means EF1 to EF4 both include a pulse motor M, which is energized with pulses from an associated motor driver 132a, 132b, 133a to 133d. Each motor driver receives a drive/stop command signal and a forward/reverse rotation command signal, and delivers an abnormality signal to MPU 131 if an abnormality occurs in the operation of the motor.

A power supply circuit C is normally connected to a source such as a commercially available alternating current supply or a battery, and always supplies a voltage Vbc which is required for status monitoring, data processing and data retention to MPU 131. A power supply circuit B is connected to the source through a relay RLb, delivering an operating voltage Vc which is required for signal processing, electrical control or other electric circuit operation to various electrical circuits within the system. A power supply circuit A is connected to the source through a relay RLa, supplying a drive voltage Vd required to energize the motors to the motor drivers. The relays RLa, RLb are turned on/off by relay drivers 137a, 137b. The commands to turn on/off are fed from MPU 131 to the relay drivers 137a, 137b.

Figure 16:
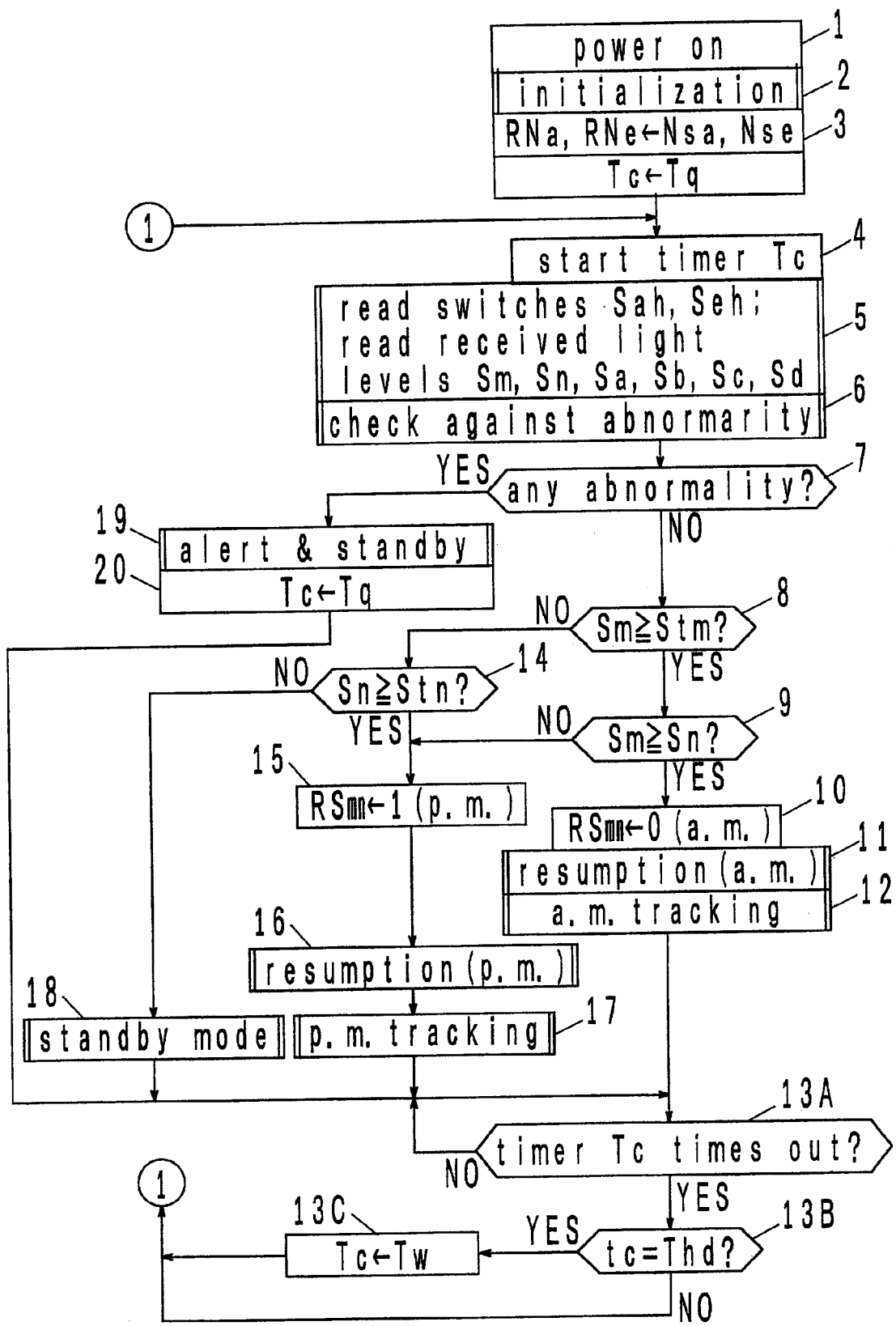
FIG. 16 is a flow chart showing the summary of a sun tracking control function of a microcomputer 131 shown in FIG. 15.

FIG. 16 generally shows the tracking control which is performed by MPU 131. Characters appearing in the flow charts shown in FIGS. 16 to 21b are indicated below.

"AZ": azimuth

"EL": elevation

RNa: a register storing the period of one step drive in "AZ" direction or the period indicated by data which is stored in the register. A setting for one step drive is determined to be "AZ" rotation corresponding to about 0.25° of the light collector.

Nsa: a reference value for the period of one step drive in "AZ", and the setting for the reference value is chosen to be one minute in conformity to 360°/24 hours equal to 0.25°/minute.

RNe: a register storing the period of one step drive in "EL" direction or the period indicated by data which is stored in the register, and the setting for one step drive is chosen to be "EL" rotation corresponding to about 0.25° of the light collector.

Nse: a reference value for the period of one step drive in "EL", and the setting for the reference value is chosen to be one minute in conformity to 180°/12 hours equal to 0.25°/minute.

Tc: a register for storing a time limit of a program timer or the time limit indicated by data stored in the register.

Tq: a control period during the preparation of a tracking operation immediately after a change from the absence to the presence of available solar radiation, and a setting value is chosen to be 8 seconds.

Tn: a control period during the daytime when the sun is in sight, with a setting of 4 minutes.

Tw: a confirmation period for examining whether the sun, which once disappeared, appeared again with the setting of 8 minutes.

Thd: a dawn waiting time, with a setting of 12 hours.

Sm: the level of light received by the a.m. radiation detecting photosensor PSm.

Stm: a threshold value for determining the presence or absence of available a.m. solar radiation.

Sn: the level of light received by the p.m. radiation detecting photosensor PSn.

Stn: a threshold value for determining the presence or absence of available p.m. solar radiation.

Sa: a level of light received by "EL" tracking lag detecting pipe 81a.

Sb: a level of light received by "EL" tracking advance detecting pipe 81b.

Sc: a level of light received by "AZ" tracking lag detecting pipe 81c.

Sd: a level of light detected by "AZ" tracking advance detecting pipe 81d.

RSmn: a register for storing data indicating a result of decision for the a.m. or p.m. or one bit data stored in the register, "0" indicating the a.m. and "1" indicating the p.m.

Rθe: a register for storing "EL" angle of the light collector or "EL" angle indicated by data stored in the register.

Rθa: a register for storing "AZ" angle of the light collector or "AZ" angle indicated by data stored in the register.

RFfe: a register for storing data indicating whether or not an actual positioning in "EL" direction of the light collector with respect to the sun is required or one bit data stored in the register, with "0" indicating the need for an actual positioning.

RFfa: a register for storing data indicating whether or not an actual positioning in "AZ" direction of the light collector with respect to the sun is required or one bit data stored in the register, with "0" indicating the need for an actual positioning.

α: a threshold value for determining a tracking lag or advance.

Rθemax: a register for storing "EL" angle when the solar radiation impinges upon the first set of shafts B1 to B4 in a direction orthogonal thereto (or a switching point between a.m./p.m.) or "EL" angle indicated by data stored in the register.

Fwait: a register for storing data whether or not the appearance of the sun which once disappeared, is waited for or one bit data stored in the register, with "1" indicating that the reappearance of the sun is being waited for.

Rwc: a register for storing a waiting time for the reappearance of the sun after it has once disappeared or the waiting time indicated by data stored in the register.

Referring to FIG. 16, when a power switch, not shown, is turned on and the power supply circuit C generates and applies the operative voltage Vbc to MPU 131, a power on reset circuit, not shown, within MPU 131 generates a reset pulse, and in response to the reset pulse, CPU within MPU 131 reads an initialization program from the program ROM within MPU 131 and writes it into RAM, thus initializing MPU 131 (or CPU system) in accordance with the initialization program (step 1). Upon completion of the initialization, MPU 131 writes a reference period Nsa (one minute) of "AZ" step drive into a register RNa, and writes a reference period Nse (one minute) of "EL" step drive into a register RNe (step 2). In the description to follow, the term "step" is omitted and it should be understood that numerals in parentheses represent a step number.

One unit of "AZ" step drive comprises pulsing each pulse motor M of the drive means EF1 to EF4 for an amount of rotation of about 0.25° of the azimuth shaft 4 as energized by the motor drivers 133a to 133d in response to a single (one pulse) "AZ" drive command applied to the motor drivers 133a to 133d by MPU 131. However, it should be understood that the term "step" as used in the terminology ""AZ" step drive" is distinct from the term "step" as used in the terminology "step drive" (phase switching) of the pulse motor M. Similarly, one unit of "EL" step drive comprises pulsing of each pulse motor M of the drive means ES1, ES2 for an amount of rotation of about 0.25° of the elevation shafts B1 to B4 as energized by the motor drivers 132a, 132b in response to a single (one pulse) "EL" drive command applied to the motor drivers 132a, 132b by MPU 131. It is also to be noted that the term "step" as used in the terminology ""EL" step drive" is distinct from the term "step" as used in the terminology "step drive" (phase switching) of the pulse motor M.

MPU 131 then writes the control period Tq (8 seconds) during the preparation of the tracking operation into a register Tc (3), and starts a program timer Tc having a time limit of Tc=Tq (4). It then applies a relay on command to the relay driver 137b, thus turning the relay RLb on. In response thereto, the power supply circuit B generates a voltage (Vc) and applies it to various electrical circuits. At a timing when the voltage (Vc) is stabilized and outputs from the various electrical circuits are stabilized, MPU 131 reads open and/or close signal from the switches Sah and Seh, and reads input voltages to the A/D conversion input ports or the detected amount of light Sm, Sn, Sa to Sd through a digital conversion (5). It then determines whether or not there is any abnormality on the basis of the signals and data read (6). If the presence of an abnormality is determined, it provides an alert through an alarm (indicator light) not shown, and switches its outputs to those designed for standby mode (cease the drive of mechanisms)(19), writes the control period Tq (8 seconds) into the register Tc (20), waits for the time-out of the timer Tc which is started at the step 4 (13A), and upon time-out, it returns to the processing operation which begins with the step 4.

When the absence of any abnormality is determined, if the level Sm of light received by the photosensor PSm is equal to or greater than the threshold value Stm and the level Sn of light received by the photosensor PSn, the microcomputer determines that there exists the solar radiation and that it is now in the morning, from the angle with which the solar radiation irradiates the reference plane Ps, and writes "0" indicating "a.m." into a register RSmn (8 to 10). In this instance, the operation proceeds through "resumption (a.m.)" (11) to "a.m. tracking" (12). The detail of the operation which take place in these routines (11, 12) will be described in detail later.

In the event the level Sm of light received by the photosensor PSm is less than the threshold value Stm while the level Sn of light received by the photosensor PSn is equal to or greater than the threshold value Stn, the microcomputer determines that there is available solar radiation and it is now in the afternoon, and thus writes "1" indicating "p.m." into a register RSmn (8–14–15). In this instance, the operation proceeds through "resumption (p.m.)" (16) to "p.m. tracking" (17). The detail of the operations in these routines (16, 17) will also be described later.

If the level Sm of light received is less than the threshold value Stm and the level Sn of light received is less than the threshold value Stn, this means that there is no available solar radiation, and accordingly, the microcomputer proceeds to "standby mode" (18), the detail of which will also be described later.

After "a.m. tracking" (12), "p.m. tracking" (17) or "standby mode" (18), the microcomputer waits for the time-out of the timer Tc (13A) and upon time-out, it starts the program timer Tc again (4), resuming the operations which begin with the step 5. In this manner, the tracking control which begins with the step 5 is repeated with a period (control period) having a time limit value of Tc. However, it should be noted that the time limit value Tc is changed depending on the daytime, the nighttime or whether or not the sun appears or does not appear during the daytime, as will be described later, and hence the control period does not remain constant. The tracking control by MPU 131 will be described in detail according to different aspects.

(a) The Operation Around the Sunrise

The operation which takes place immediately after the sunset which will be described later (116, 118 to 122 in FIG. 20) establishes the light collectors (or the support assemblies A11 to A44) in their reference attitude (azimuth HP: "AZ" HP and elevation HP: "EL" HP) and a timer having a time limit value of Tc equal to Thd (12 hours) to wait for the dawn is started, thus waiting for a time-out of the timer at step 13A shown in FIG. 16. The relays RLa, RLb are off, and the power supply circuits A, B are interrupted from the source (sleep).

By way of example, assuming that the operation which takes place immediately after the sunset is made at 7 o'clock p.m. of yesterday, MPU 131 rewrites the time limit value Tc of the timer to the waiting time Tw (8 minutes) to wait for the appearance of the sun (13B, 13C) in response to the time-out of the timer Tc which occurs at 7 o'clock a.m. of today, starts the timer with the time limit value of Tc equal to Tw (4), turns the relay RLb on, and reads the status of the switches Sah, Seh, and the levels of light received Sm, Sn, Sa, Sb, Sc and Sd (5). If no abnormality is found during the examination for any abnormality (6), the microcomputer then determines whether available radiation is detected, whether available a.m. radiation is detected or whether available p.m. radiation is detected (8, 9, 14).

If available radiation is not detected, the microcomputer proceeds to "standby mode" (18), (see FIG. 20 for detail), writes "1" indicating a non-detection of solar radiation into a register Fwait (113), and clears the count Rwc (114). Subsequently, the microcomputer repeats the loop operation comprising the steps 13A–13B–4 to 8–14–18 (or 112–117–118 in FIG. 20—13A in FIG. 16) with a period of Tc equal to Tw until available solar radiation is detected. Accordingly, if the sunrise is retarded, or a rainfall or cloudy sky continues from before the time of sunrise and no available solar radiation is detected, for example, the operation to track the sun is not initiated, and accordingly the light collectors (or support assemblies A11 to A44) are maintained in their reference attitude "AZ"HP and "EL"HP and only the count Rwc is incremented (117 in FIG. 20). It is to be noted that one unit or "1" in the count Rwc represents 4 minutes, and changes in "AZ" and "EL" angles of the sun, Δθa and Δθe, are equal to about 1°, respectively.

(b) Pretreatment for Tracking the Sun When Available a.m. Radiation is Detected

Figure 21A:
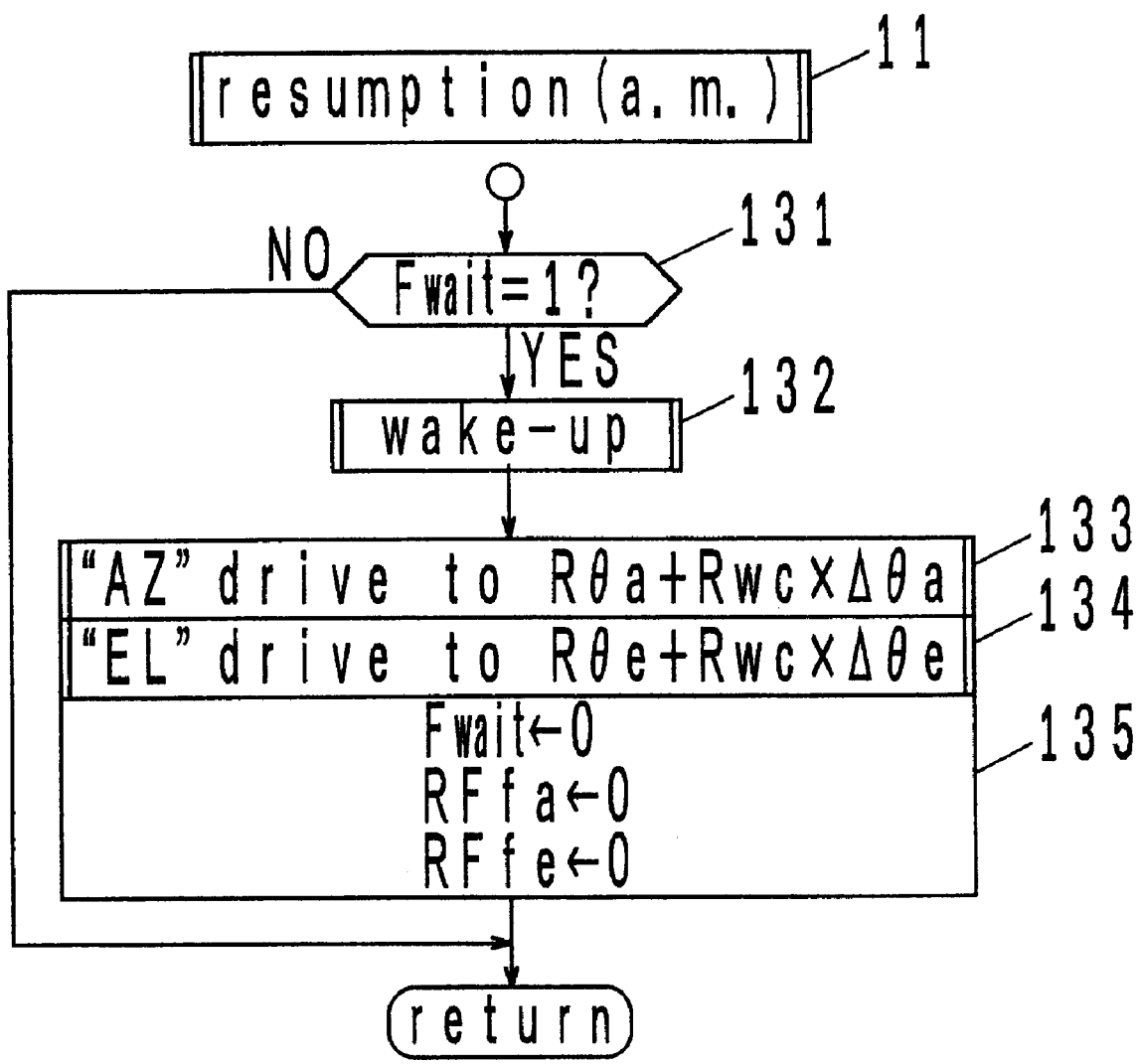
FIGS. 21*a* and 21*b* are flow charts showing the detail of "resumption (a.m.)" (11) and "resumption (p.m.)" (16) shown in FIG. 16.
Figure 21B:
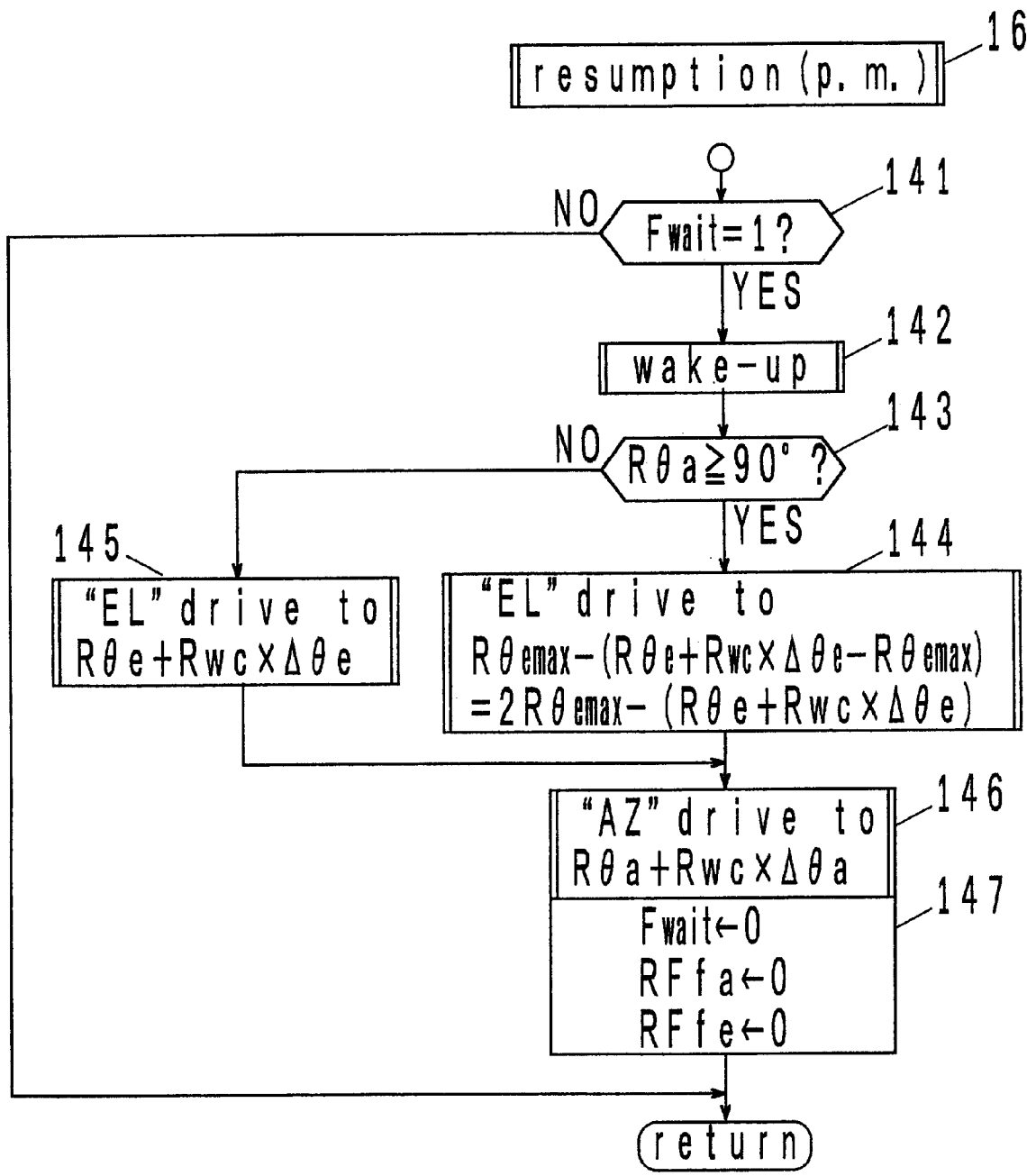

When available a.m. solar radiation is detected, MPU 131 proceeds from step 9 to step 10 in FIG. 16, writing "0" into the register RSmn, turning the relays RLa, RLb on (132) at "resumption (a.m.)" (11), (see FIG. 21a for detail), driving the light collectors to estimated "AZ" position of the sun (Rθa+Rwc×Δθa), and writing data which represents such position into "AZ" register Rθa (133 in FIG. 21a). It also drives the light collectors to the estimated "EL" position of the sun (Rθe+Rwc×Δθe), and writes data representing such position into "EL" register Rθe (134). It should be noted that this "AZ" drive of the light collectors is orienting them toward an estimated position, which is not always in coincidence with the actual position of the sun. Rather, it must be estimated that there is a large error. Accordingly, "0" indicating that this "AZ" positioning is of a low reliability, requiring an actual positioning, is written into a register RFfa. For "EL" drive of the light collectors, "0" is written into a register RFfe for the same reason. Subsequently, "0" indicating the detection of available solar radiation is written into a register Fwait (135), then proceeding to "a.m. tracking" (12), (see FIG. 17 for detail).

(c) "a.m. Tracking"(12)

Figure 17:
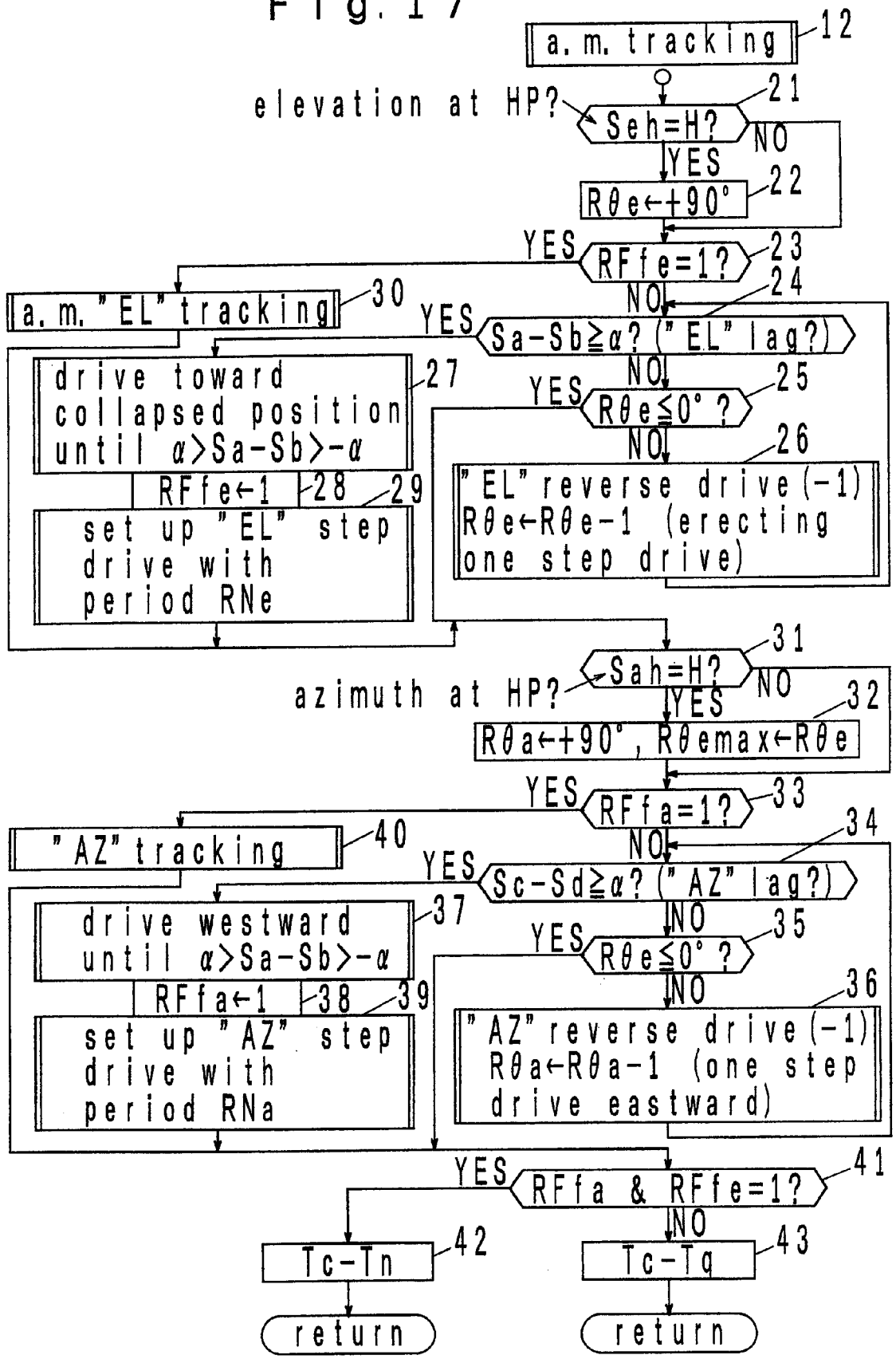
FIG. 17 is a flow chart showing the detail of "a.m. tracking" (12) shown in FIG. 16.
Figure 18:
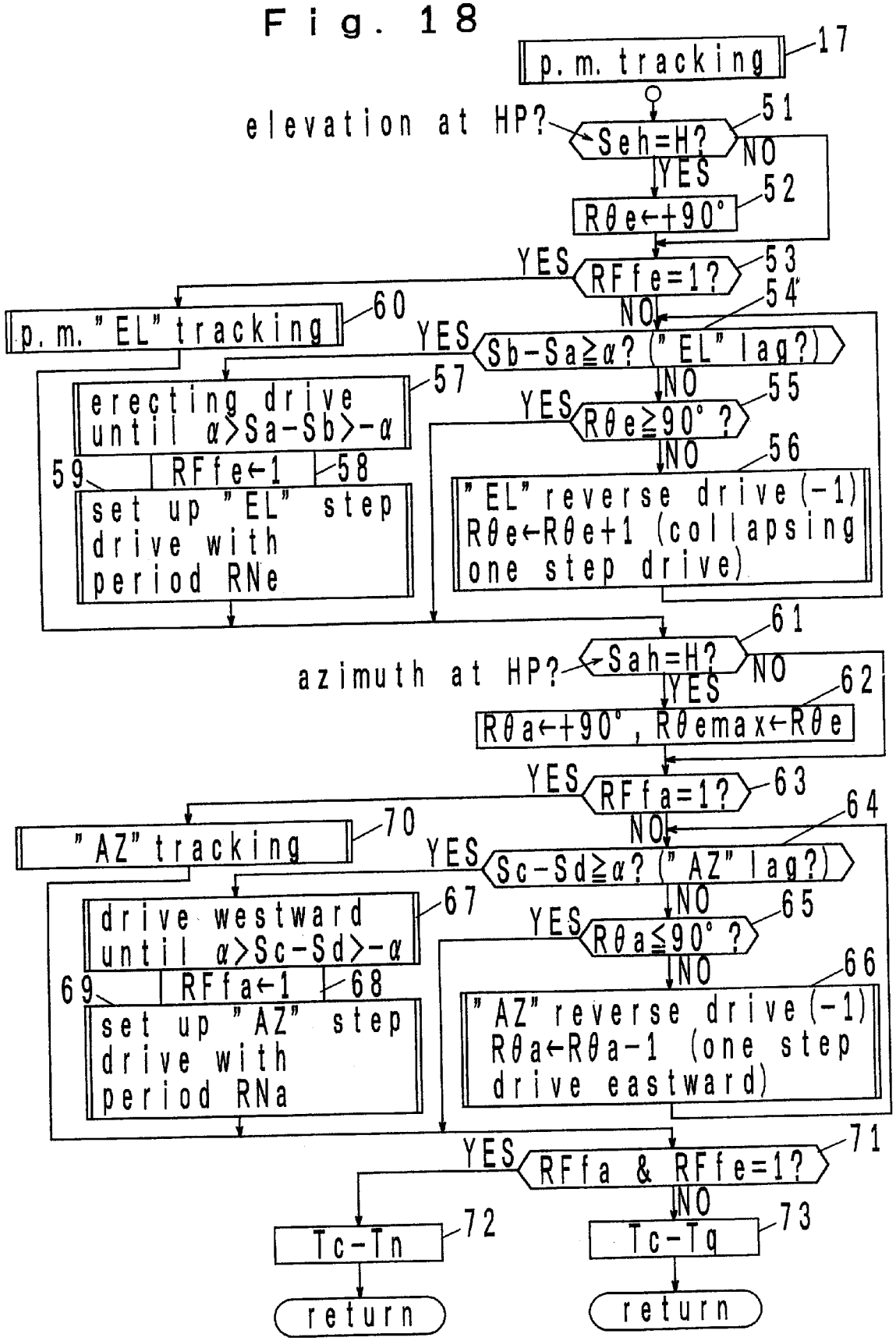
FIG. 18 is a is a flow chart showing the detail of "p.m. tracking" (17) shown in FIG. 16.

Reference is made to FIG. 17. If the switch Seh is off (H), this means the detection of the light collectors at "EL" HP, and hence, +90° representing such position is written into "EL" register Rθe (21, 22). Similarly, if the switch Sah is off (H), this means the detection of the light collectors at "AZ" HP, +90° representing such position is written into "AZ" register Rθa, and because the prevailing "EL" angle Rθe represent a burning point from the "EL" updrive to downdrive of the light collectors, it is written into a register Rθemax (32).

When data stored in the register RFfe indicates "0", indicating the need for an actual positioning, the operation proceeds from step 23 to step 24 where it is examined whether "EL" position of the light collectors is lagging with respect to "EL" position of the sun ("EL" tracking lag) (24), providing "EL" drive to the first set of shafts B1 to B4 until the lag is removed. For each step drive, data in "EL" register Rθe is updated by one step drive (27). When the lag is removed, data in the register RFfe is rewritten into "1", indicating the completion of an actual positioning (28), and an interrupt is set up which commands one step "EL" up drive (an upward drive for tracking a rising motion of the sun) to the drivers 132a, 132b with a period RNe which is indicated by data stored in the register RNe (29). Accordingly, the light collectors are subsequently subject to "EL" up drive at a rate of one step (about 0.25°) per period RNe.

When data in the register RFfe is "0", indicating the need for an actual positioning, if it is found that there was no "EL" tracking lag, step by step "EL" return drive (repeating 24 to 26) takes place. However, when "EL" tracking lag occurs, the "EL" drive which removes the lag in the manner mentioned above takes place, and when the lag is removed, "1" is written into the register RFfe, indicating the completion of an actual positioning (28).

If data in the register RFfa is "0", indicating a need for an actual positioning, an actual positioning of the light collectors in "AZ" direction takes place (33 to 39) in the similar manner as the actual positioning in "EL" direction (23 to 29) mentioned above. Upon completion of the actual positioning, data in the register RFfa is rewritten into "1", indicating the completion of the actual positioning (38), and an interrupt is set up for commanding one step "AZ" westward drive (a lateral drive to track the motion of the sun to the west) to the drivers 133a to 133d with a period RNa which is indicated by data stored in the register RNa (39). Accordingly, the light collectors are subsequently subject to "AZ" drive at a rate of one step (about 0.25°) per period RNa.

Figure 19A:
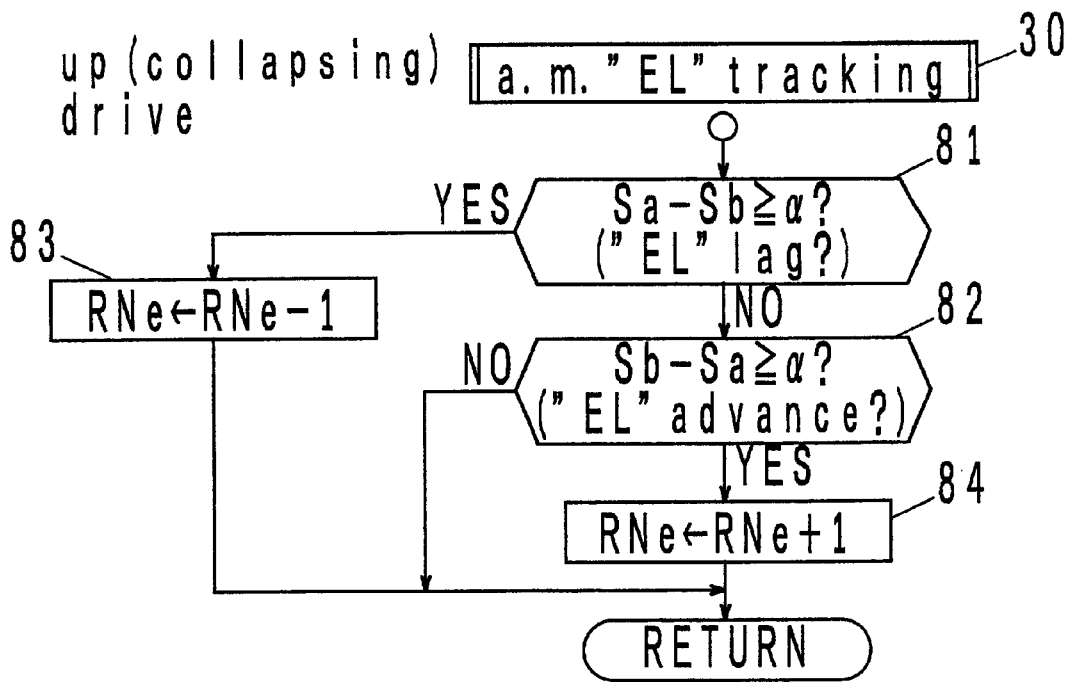
FIGS. 19*a*, 19*b* and 19*c* are flow charts showing the detail of "a.m. "EL "tracking" (30) shown in FIG. 17, "p.m. "EL" tracking" (60) shown in FIG. 18, and ""AZ" tracking" (40) and (70) shown in FIGS. 17 and 18.
Figure 19B:
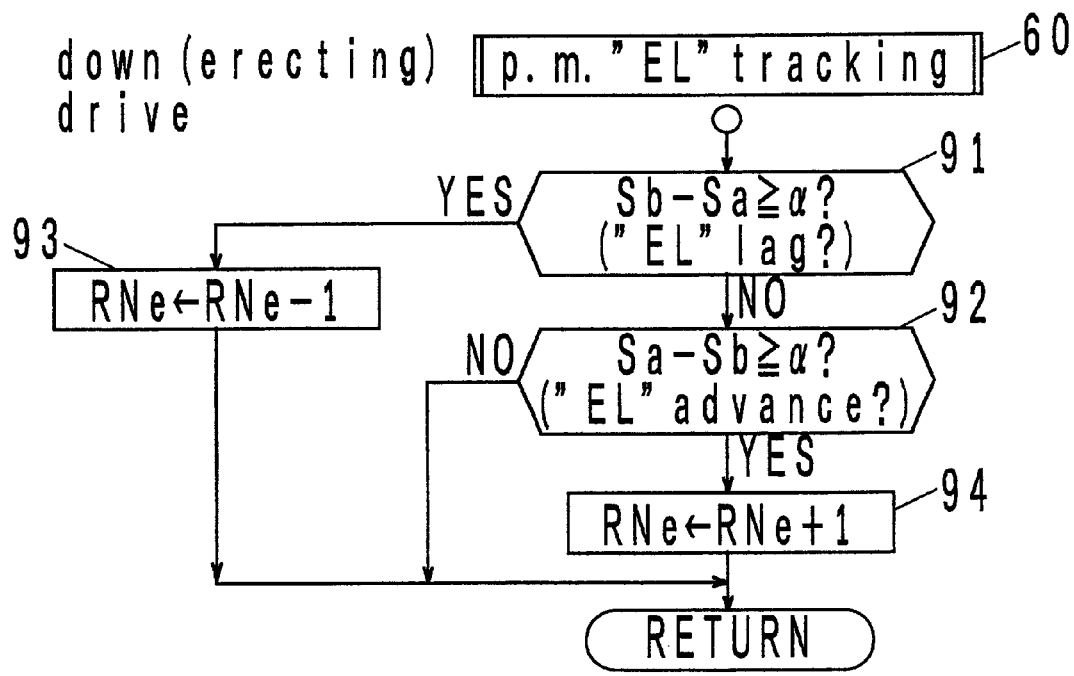
Figure 19C:
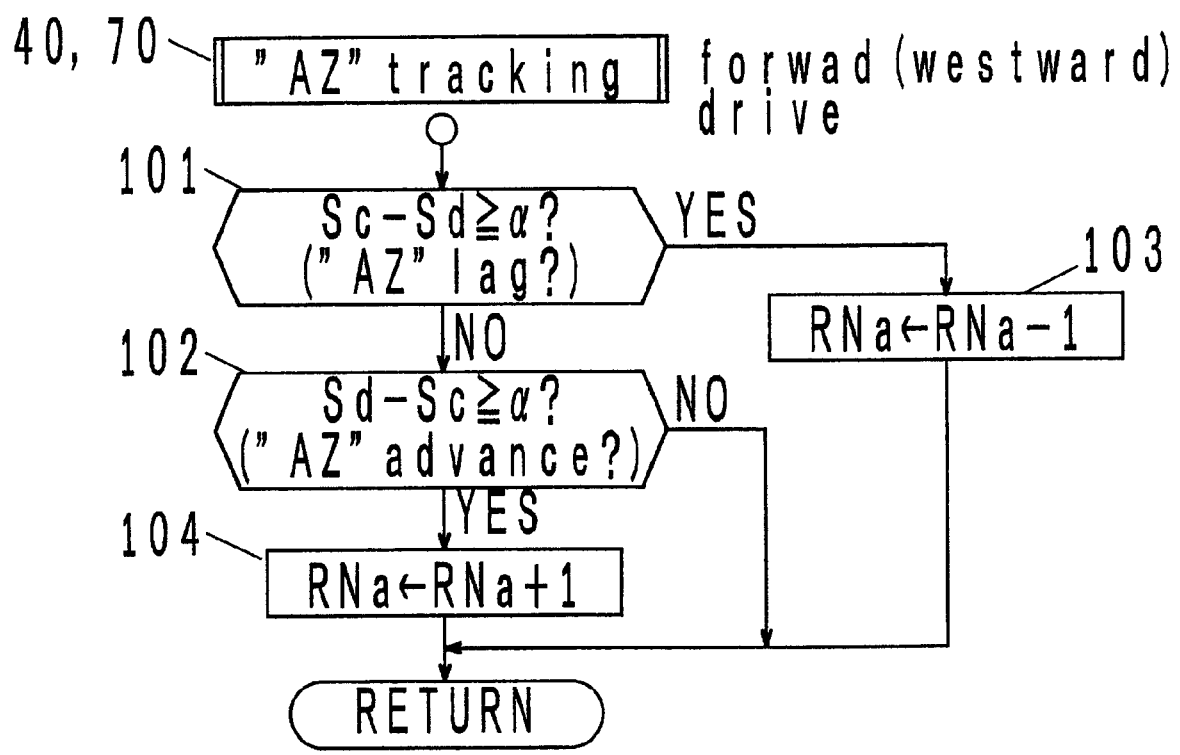

When the actual positioning in both "EL" and "AZ" directions is completed and available a.m. solar radiation is subsequently detected, "a.m. "EL" tracking" (30) and ""AZ" tracking" (40) are repeated with a period of Tc equal to Tn (4 minutes). The detail of these operations are shown in FIGS. 19a and 19c.

During "a.m. "EL" tracking" (30), whenever "EL" tracking lag occurs, "EL" step drive period RNe is decremented by one (81, 83). Thus, the step drive period RNe is shortened to accelerate the "EL" tracking drive rate. When "EL" tracking advance occurs, "EL" step drive period RNe is incremented by one (82, 84). In this manner, the step drive period RNe is lengthened to retard "EL" tracking drive rate.

During ""AZ" tracking" (40), if "AZ" tracking lag occurs, "AZ" step drive period RNa is decremented by one (101, 103). Thus, the step drive period RNa is shortened to accelerate the "AZ" tracking drive rate. If "AZ" tracking advance occurs, "AZ" step drive period RNa is incremented by one (102, 104). Thus, the step drive period RNa is lengthened to retard "AZ" tracking drive rate.

For each execution of "a.m. tracking" (12), if the actual positioning in both "EL" and "AZ" directions is complete, Tn (4 minutes) is written into the register Tc (41, 42). However, if the actual positioning in either direction is incomplete, Tq (8 seconds) is written into the register Tc (41, 43). As a consequence, if at least one of the actual positioning in either "EL" and "AZ" directions remains incomplete, "a.m. tracking" (12) is repeatedly executed with a period of Tq (8 seconds). When the actual positioning in both directions is complete, this routine is repeatedly executed with a period of Tn (4 minutes during which the sun changes its position by about 1°).

(d) Pretreatment for Tracking the Sun When Available p.m. Solar Radiation is Detected When available p.m. solar radiation is detected, MPU 131 proceeds from step 14 to step 15 in FIG. 16, writing "1" into the register RSmn. During "resumption (p.m.)" (16, see FIG. 21b for detail), it turns the relays RLa, RLb on (142) driving the light collectors to the estimated "EL" position of the sun. Specifically, for Rθa≧90°, the light collectors are driven to "EL" return position "2Rθemax−(Rθe+Rwc×Δθe) from "EL" position Rθemax which is a turn-back point from "EL" up drive to down drive. For Rθa<90°, the light collectors are driven to "EL" up drive position (Rθe+Rwc×Δθe) and data representing such position is written into the register Rθe (143 to 145 in FIG. 21b). Also, the light collectors are driven to the estimated "AZ" position of the sun "Rθa+Rwc×Δθa", and data representing such position is written into the register Rθa (146). When effecting "EL" drive as mentioned above, "0", indicating that this "EL" positioning is of a low reliability, requiring an actual positioning, is written into the register RFfe, and when effecting "AZ" drive of the light collectors, "0" is written into the register RFfa for the same reason, and "0" indicating the detection of available solar radiation, is written into the register Fwait (147). The operation then proceeds to "p.m. tracking" (17, see FIG. 18 for detail).

(e) "p.m. Tracking" (17)

During "p.m. tracking" (17), "AZ" tracking drive control remains the same in content as the corresponding control during "a.m. tracking" (12) mentioned above. However, it should be noted that during "p.m. tracking" (17), the direction of motion of the sun proceeds in the opposite direction from the a.m. operation, and accordingly, the content of "EL" tracking drive control differs from "a.m. tracking" (12) in respects of the decision and calculation (54, 57) of "EL" lag and advance, and the direction in which the light collectors are driven to remove the tracking lag and advance is in the opposite direction. In other respects, "p.m. tracking" (17) is similar in detail to "a.m. tracking" (12), and therefore will not be described specifically.

(f) The Operation When Available Solar Radiation Ceases to be Detected

During the initial "standby mode" (18, see FIG. 20 for detail) upon changing from the detection to non-detection of the solar radiation, MPU 131 writes "1", indicating non-detection of the solar radiation, into the register Fwait (112, 113), clears the timing register Rwc (114), writes Tw (8 minutes) as the time limit value Tc (115), and turns the relays RLa, RLb off (116). Subsequently, as long as the solar radiation continues not to be detected, the microcomputer proceeds to "standby mode" (18) with the period of Tc equal to Tw (8 minutes), incrementing the count Rwc (112, 117), and examining whether the estimated "AZ" position of the sun "Rθa+Rwc×Δθa" has reached 180° ("AZ" upper limit position) (118). When the upper limit position is reached, the operation proceeds to the treatment at the sunset.

(g) The Operation When Available Solar Radiation Begins to be Detected

The operation proceeds to "resumption (a.m.)" (12) or "resumption (p.m.)" (16).

(h) Treatment at Sunset

Figure 20:
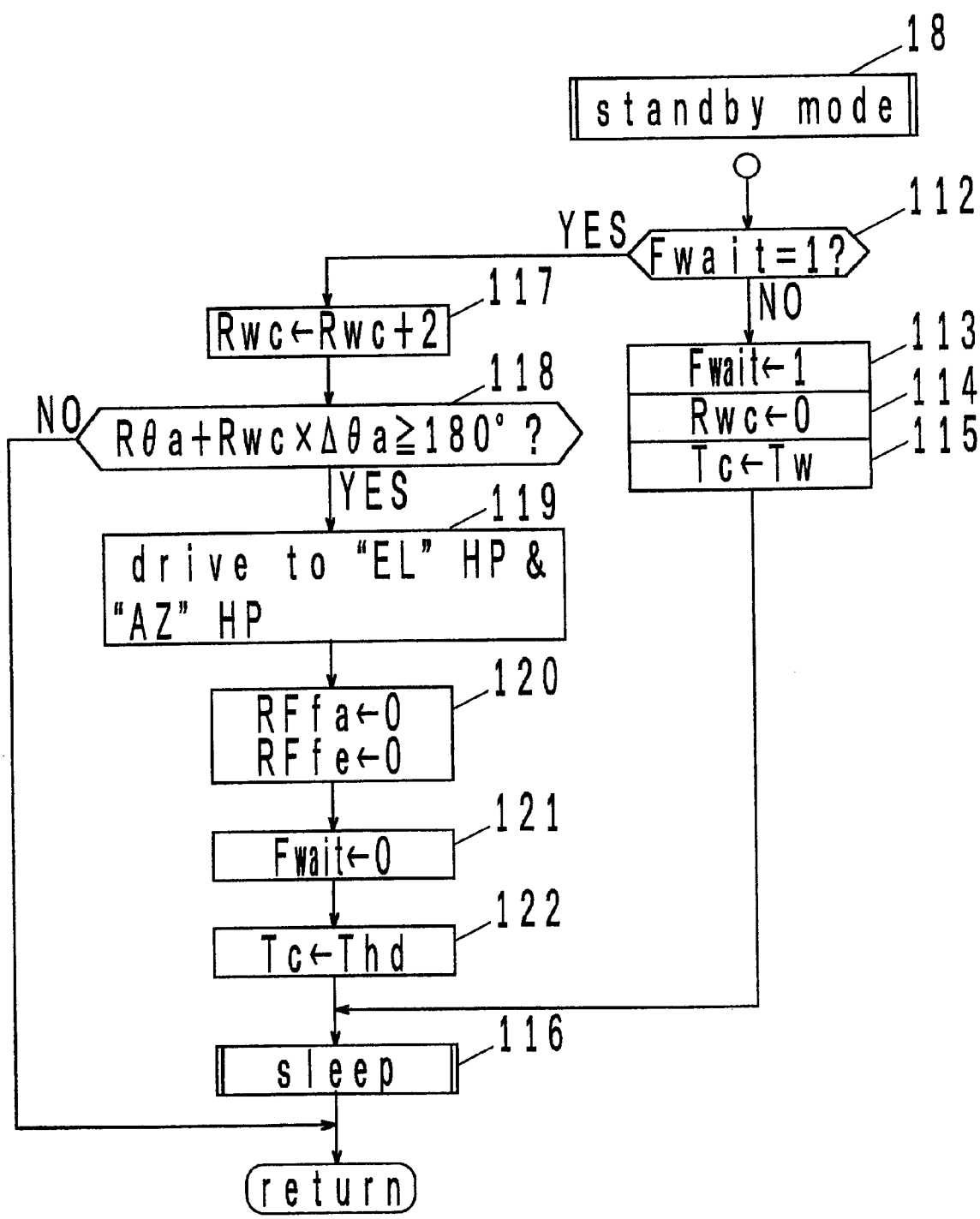
FIG. 20 is a flow chart showing the detail of "standby mode" (18) shown in FIG. 16.

Upon sunset, if two requirements that available solar radiation is not detected and that the estimated "AZ" position of the sun "Rθa+Rwc×Δθa" has reached 180° (or "AZ" upper limit position) are simultaneously satisfied, MPU 131 drives the light collectors (or support assemblies A11 to A44) to "EL" HP and "AZ" HP, and writes HP data +90° into the registers Rθe, Rθa (119 in FIG. 20). In this manner, the support assemblies A11 to A44 are brought to their reference attitude (or standby attitude) shown in FIGS. 1 to 3. Registers RFfa, RFfe are cleared (120), the register Fwait is also cleared (121), and dawn waiting time Thd (12 hours) is written into the register Tc (122). The operation then proceeds to step 13A shown in FIG. 16, waiting for the time-out of the timer Tc equal to Thd (12 hours). The subsequent description returns to the paragraph (a).

Second Embodiment

Figure 22:
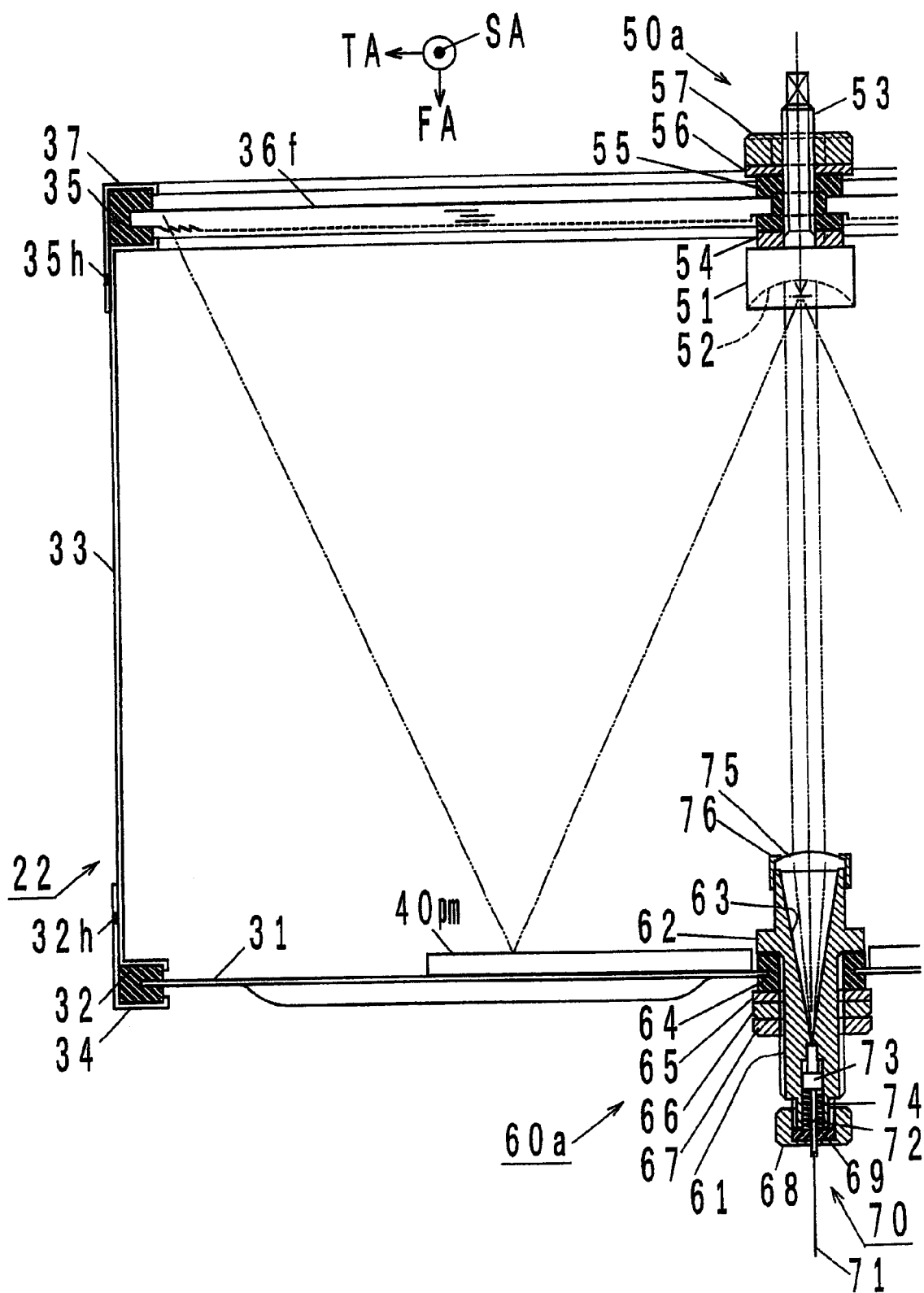
FIG. 22 is an enlarged longitudinal section of part of a light collector 22 according to a second embodiment of the invention.

FIG. 22 shows a second embodiment of the light collector 22. In this embodiment, the light transmitting plate 36 of the first embodiment is replaced by Fresnel lens 36f, and its focused light is reflected by a plane mirror 40pm to a second parabolic mirror 52. Replacing the light transmitting plate 36 of the first embodiment by Fresnel lens 36f and changing the first parabolic mirror 40a of the first embodiment to a plane mirror 40pm are distinctions from the first embodiment, and in other respects, the arrangement is similar to the first embodiment.

Third Embodiment

Figure 23:
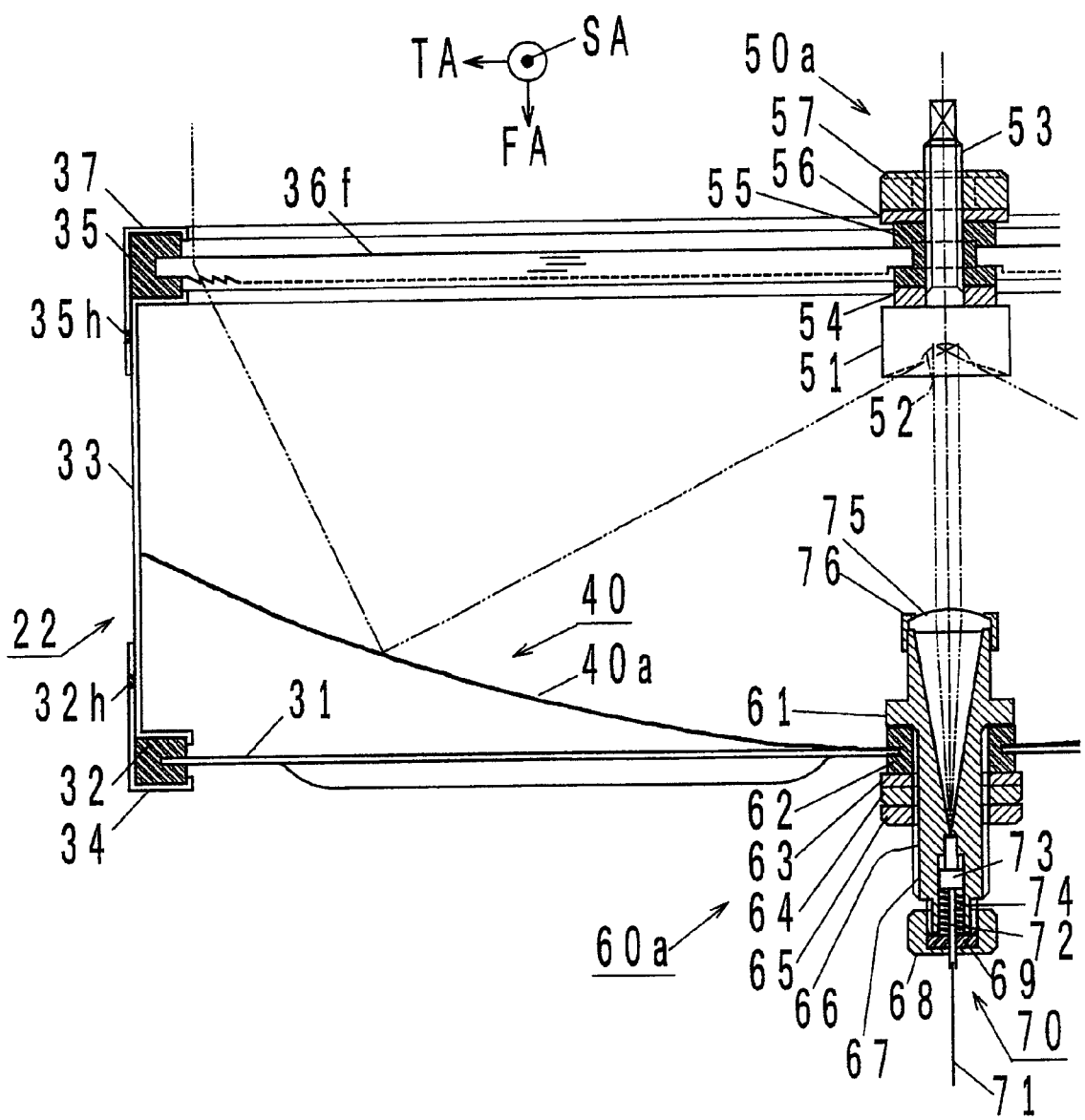
FIG. 23 is an enlarged longitudinal section of part of a light collector 22 according to a third embodiment of the invention.

FIG. 23 shows a third embodiment of light collector 22. In this embodiment, the light transmitting plate 36 of the first embodiment is replaced by Fresnel lens 36f, and its focused light is further focused by a first parabolic mirror 40a to be reflected to a second parabolic mirror 52. Replacing the light transmitting plate 36 of the first embodiment by Fresnel lens 36f represents a distinction over the first embodiment. In other respects, the arrangement is similar to the first embodiment. With this embodiment, the tallness or thickness of the light collector 22 in a direction viewing the sun (or the distance between 36f and 31) can be greatly reduced.

Fourth Embodiment

Figure 24:
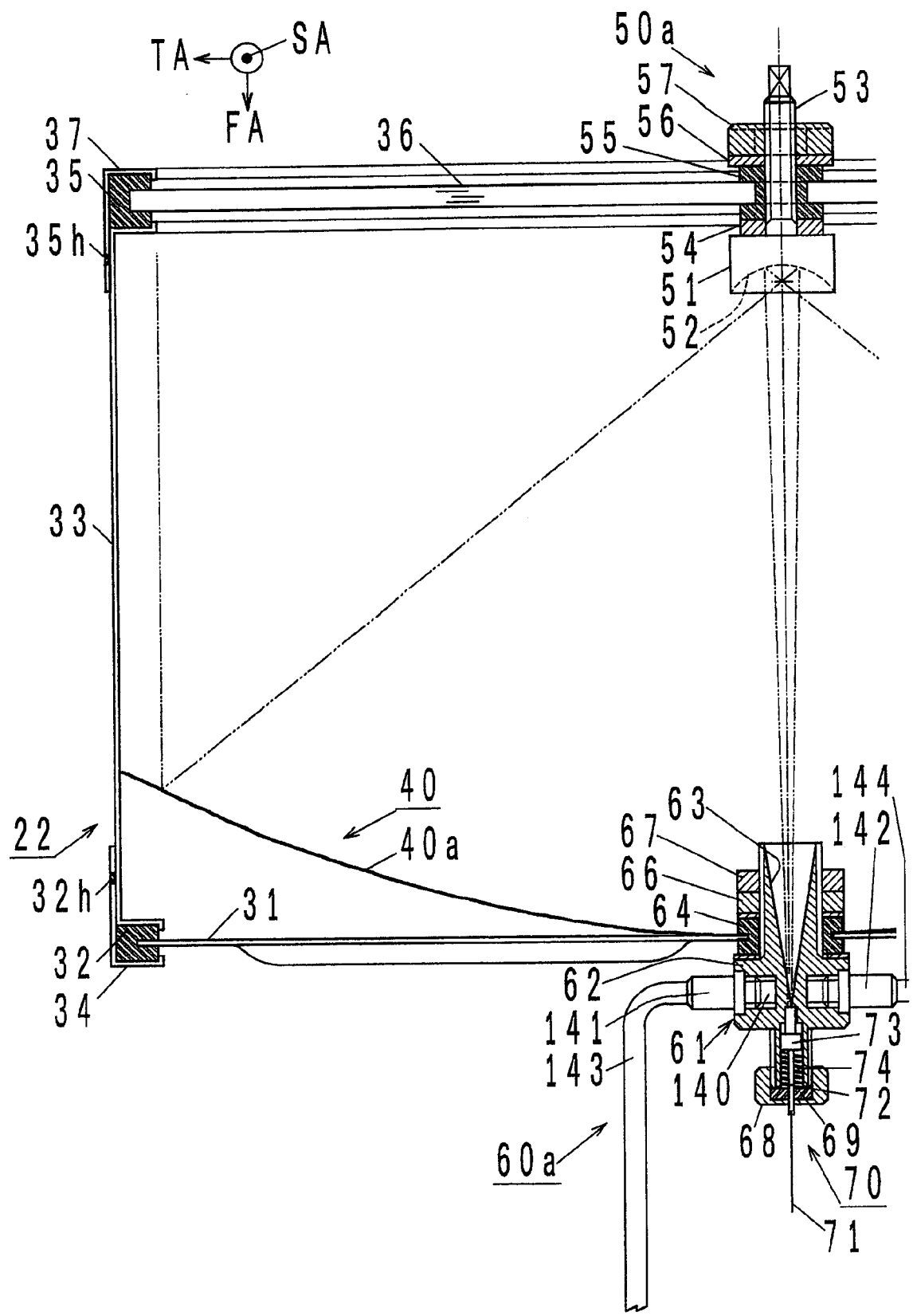
FIG. 24 is an enlarged longitudinal section of part of a light collector 22 according to a fourth embodiment of the invention.

FIG. 24 shows a fourth embodiment of light collector 22. In this embodiment, the condensing lens 75 used in the first embodiment is omitted, and the second parabolic mirror 52 is disposed at a little longer distance from the first parabolic mirror 40a so that a point conversion of light substantially on the front end face of the ferrule 73 can be achieved. Manufacturing tolerance of an optical system or a coarse sun tracking may cause a light reflection loss or a degradation in the photo-thermal conversion at the lighting sleeve 61 may increase as the number of times the reflection by the conical mirror surface 63 increases, resulting in a temperature rise of the lighting sleeve 61. In the present embodiment, a heat exchange fluid is passed through the lighting sleeve 61 to cool it while utilizing the heat therefrom.

The lighting sleeve 61 is formed with a ring-shaped channel 140 through which a heat exchange fluid is passed so as to surround the conical opening in which the conical mirror surface 63 is defined, with a pair of mouthpiece 141, 142 being fitted with the channel 140. Heat resistant, pressure resistant, flexible tubes 143, 144 are fixedly connected with the mouthpieces 141, 142 for feeding and discharging the heat exchange fluid. In the present embodiment, the fluid feed/discharge tubes connected to the respective lighting sleeve 61 of all the light collectors 21 to 24 which are mounted on a common support assembly (such as A11, for example) are connected in series. Thus, a pair of heat exchange fluid feed/discharge tubes are associated with a single support assembly, passing through the azimuth shaft (4), the duct pipe (20), the elevation shaft (B1) and the duct (CAd).

Fifth Embodiment

Figure 25:
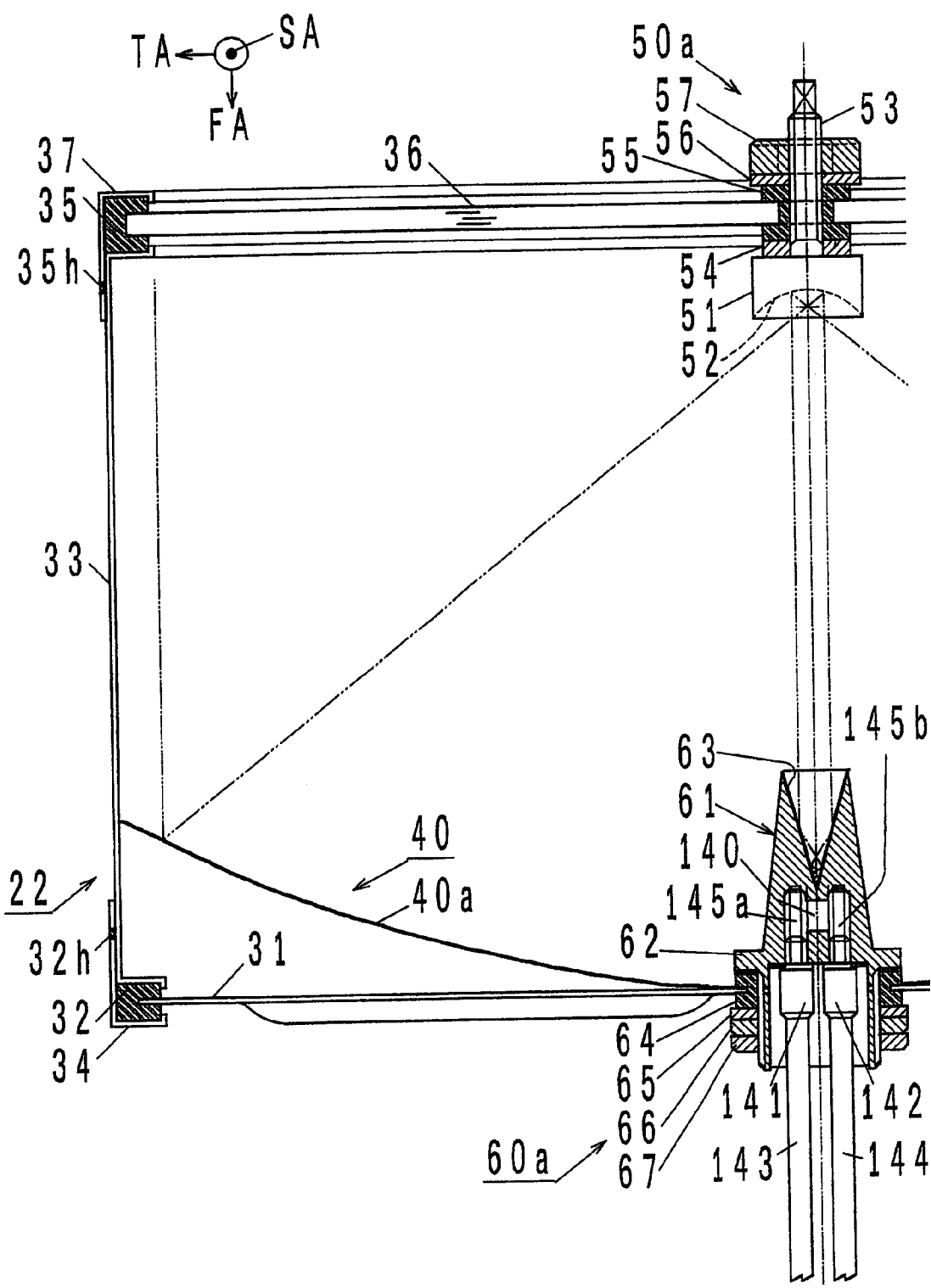
FIG. 25 is an enlarged longitudinal section of part of a light collector 22 according to a fifth embodiment of the invention.

FIG. 25 shows a heat collector 22 which converts solar radiation into heat for heating a heat exchange fluid. The heat collector 22 comprises the light collector block 61, as illustrated in FIG. 12, for example, which is changed into a photo-thermal conversion block 61 which converts the collected solar radiation into heat. The photo-thermal conversion block 61 has a conical blind opening, the inner wall surface of which or conical surface 63 is a light absorbing surface having a high photo-thermal conversion efficiency which is formed by a blackening treatment of metal surface. The conical surface 63 has a relatively small angle of inclination with respect to the center axis thereof so that the solar radiation which impinges on the conical surface 63 adjacent to the opening thereof repeats the reflection on the conical surface 63 a number of times before it reaches the bottom of the conical surface 63. Each time the solar radiation impinges on the conical surface 63, part of the radiation is converted into heat, and the solar radiation will be greatly attenuated as a result of a repeated reflection on the conical surface 63 until it reaches the bottom of the conical surface 63. Upon reaching the bottom of the conical surface 63, the solar radiation now repeats reflection a number of times on the conical surface 63 to exit through the opening of the conical surface 63, losing part of the radiation in the form of heat each time it is reflected.

A channel 140 through which a heat exchange fluid is passed is disposed on the backside of the conical surface 63 and continues to a pair of threaded bores 145a, 145b which are formed through the bottom surface of the block 61. A pair of hollow mouthpieces 141, 142 are screwed into the respective threaded bores 145a, 145b, and are connected with heat resistant, flexible and heat insulating tubes 143, 144, respectively, for feeding and discharging the heat exchange fluid. The channels 140 of 4×4=16 heat collector units which are supported on a support assembly such as A11 are connected in series with each other on the support assembly through the tubes 143, 144 which connect between the individual units, and are also connected in series with the channels of the heat collector units mounted on adjacent one of support assembly such as A12. Thus, a pair of fluid feed/discharge tubes are associated with a pair of support assemblies such as A11, A12, and extend through openings formed in the peripheral surface of the second set of shafts (4) or azimuth shafts to enter the internal space thereof to extend along the axes, and through the duct CAd to be assembled to a bundle OFc. Thus, 4×4/2 equal to 8 pairs of fluid feed/discharge tubes are bundled together in the thickest portion of the bundle OFc.

Sixth Embodiment

Figure 26:
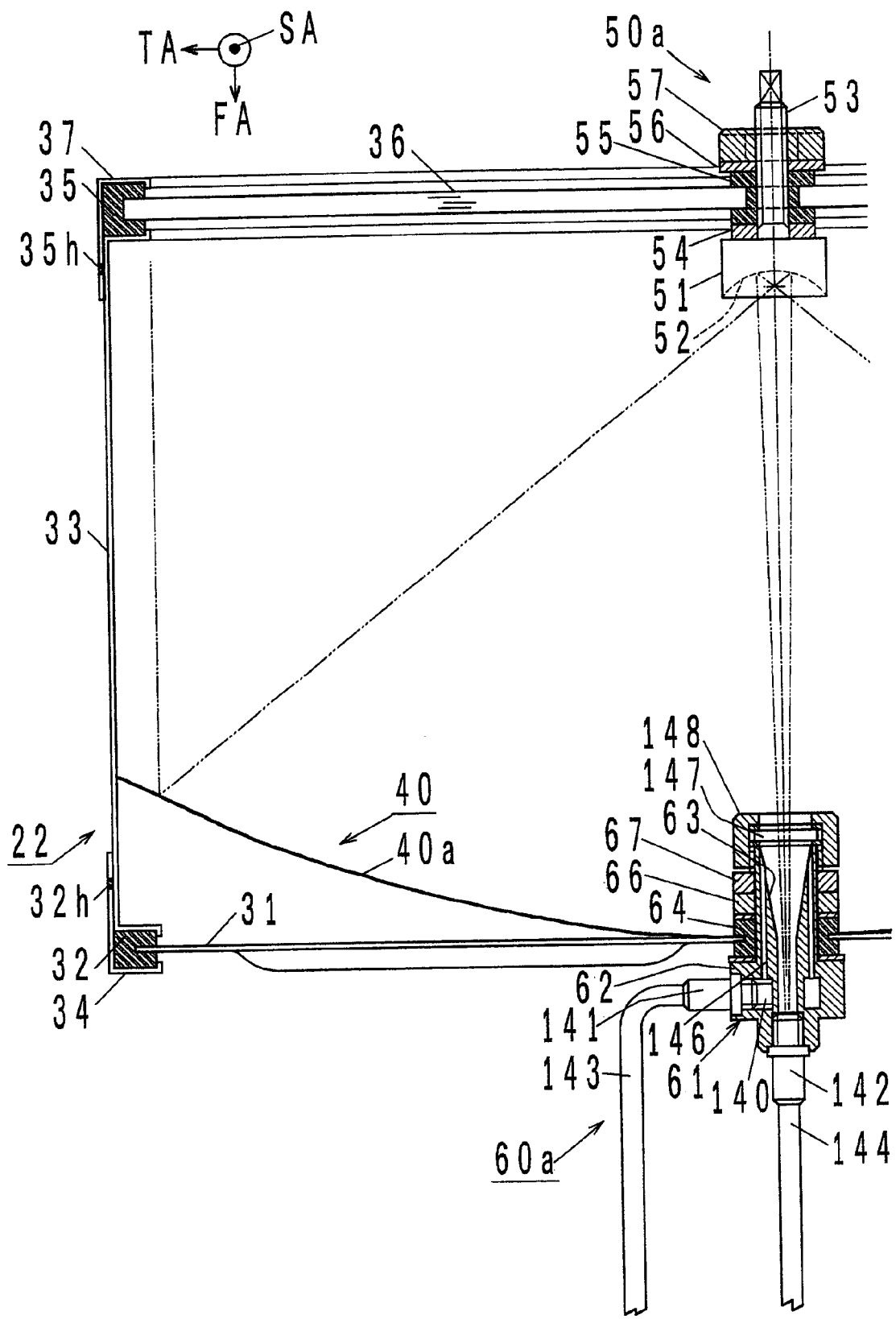
FIG. 26 is an enlarged longitudinal section of part of a light collector 22 according to a sixth embodiment of the invention.

FIG. 26 shows a heat collector 22 which converts solar radiation into heat for heating a heat exchange fluid. The heat collector 22 comprises the lighting sleeve 61 which has a conical opening in the form of a channel of a relatively large diameter at the light axis of the second mirror 52 and presenting a conical surface 63 which is a mirror finish. The conical opening is closed by a light transmitting plate 147 and a retainer cap nut 148 in a hermetically sealed manner.

The lighting sleeve 61 is formed with a ring-shaped channel 140 through which a heat exchange fluid is passed so as to surround the conical opening in which the conical mirror surface 63 is defined, with an inlet mouthpiece 141 being fitted with the channel 140. A plurality of channels 146 of relatively small diameter surround the conical surface 63 and extend from the channel 140 to the conical surface 63. An outlet mouthpiece 142 is hermetically fitted with the bottom opening of the lighting sleeve 61. The center axis of the outlet mouthpiece 142 is aligned with the optical axis of the parabolic mirror 52. Heat resistant, pressure resistant, flexible tubes 143, 144 are fixedly connected with the mouthpieces 141, 142 for feeding and discharging the heat exchange fluid. The tube 144 includes an inner metal pipe. The inner wall surface of the mouthpiece 142 and the tube 144 is a light absorbing surface having a high photo-thermal conversion efficiency which is formed by a blackening treatment of inner metal surface.

In the present embodiment, heat exchange fluid is fed into the channel 140 through the flexible tube 143 and the inlet mouthpiece 141 then the fluid flows into the flexible tube 144 through the channels 146, the conical opening (63) and the outlet mouthpiece 142. The focus of the parabolic mirror 52 is in inside of the tube 144, and accordingly, when the optical axis of the parabolic mirror 40a correctly directed toward the sun, the light which is reflected by the parabolic mirror 40a is focused to its focus where it is reflected by the parabolic mirror 52 as a collimated beam into the tube 144 and impinges on the blackening treatment of inner metal surface of the tube 144. The solar radiation which impinges on the inner surface of the tube 144 repeats the reflection on the inner surface a number of times. Each time the solar radiation impinges on the inner surface, part of the radiation is converted into heat, and the solar radiation will be greatly attenuated as a result of a repeated reflection on the inner surface.

In the present embodiment, the fluid feed/discharge tubes 143,144 connected to the respective lighting sleeve 61 of all the light collectors 21 to 24 which are mounted on a common support assembly (such as A11, for example) are connected in series. Thus, the pair of heat exchange fluid feed/discharge tubes are associated with a single support assembly, passing through the azimuth shaft (4), the duct pipe (20), the elevation shaft (B1) and the duct (CAd).

While preferred embodiments of the invention have been shown and described above, a number of changes and modifications are possible. Accordingly, the invention is not intended to be limited to the specific construction or arrangement disclosed herein, but the right is reserved to all changes and modifications coming within the scope of the invention defined by the appended claims.

What is claimed is:

1. An apparatus for capturing light energy comprising:
   an elevational rotary first shaft in a first set of shafts including at least one shaft extending in a given direction parallel to a stable planar surface on which the apparatus is installed;
   a bearing for rotatably supporting the first shaft in a manner to be rotatable about an axis thereof;
   a first set of light receptors including at least one receptor for capturing light energy;
   first drive means for driving the first shaft for rotation about the axis thereof;
   a first support assembly including a first shaft in a second set of shafts extending in a direction orthogonal to the first shaft in the first set and supported by the first shaft in the first set so as to be rotatable about an axis thereof for supporting the first set of light receptors;
   a second set of light receptors including at least one receptor for capturing light energy;
   a second support assembly including a second shaft in the second set of shafts extending in a direction orthogonal to the first shaft in the first set and supported by the first shaft in the first set so as to be rotatable about an axis thereof for supporting the second set of light receptors;
   and second drive means for driving the first and the second shafts both in the second set for simultaneous rotation in the same direction about their axes.

2. An apparatus for capturing light energy according to claim 1 in which the first support assembly including a first wheel fixedly connected with the first shaft in the second set and having a center of rotation aligned with the axis thereof, and a first worm disposed parallel to the first shaft in the first set and in meshing engagement with the first wheel; the second support assembly including a second wheel fixedly connected with the second shaft in the second set and having a center of rotation aligned with the axis thereof, and a second worm disposed parallel to the first shaft in the first set and in meshing engagement with the second wheel; and the second drive means including a fastener member for mechanically coupling the first and the second worm together for simultaneous rotation in the same direction.

3. An apparatus for capturing light energy according to claim 2 in which each of the support assemblies includes a stanchion which is fixedly mounted on the shaft of the first set at right angles thereto, and rotatably supports one of the shafts in the second set, and a duct pipe having one end fixedly connected to the first set of shaft and its other end coupled to one end of the shaft in the second set, the first set of shafts and the second set of shafts being hollow pipes and communicating with each other through an internal space within the duct pipe.

4. An apparatus for capturing light energy according to claim 3 in which each stanchion of each support assembly is fixedly connected with a worm support frame which supports each worm in a rotatable manner while constraining a movement of the worm in a direction in which the first set of shafts extend.

5. An apparatus for capturing light energy according to claim 4 in which the drive control means accelerate the rotational speed of the first set of shafts and the second set of shafts as driven by the first and second drive means in response to a tracking lag of the light receptors relative to a change in the position of the sun, and decelerates the rotational speed in response to a tracking advance of the light receptors with respect to a change in the position of the sun.

6. An apparatus for capturing light energy according to claim 5 further comprising light detecting means for detecting the presence or absence of the solar radiation at or above a given level, and for detecting whether the direction of the solar radiation is at an angle corresponding to either a.m. or p.m. sun position, the drive control means being responsive to the presence of the solar radiation at or above a given level to reverse the direction of rotation of the first set of shafts as driven by the first drive means when the direction of the solar radiation changes from an a.m. angle to a p.m. angle and being also responsive to the absence of the solar radiation at or above a given level to cease the rotation of the first set of shafts and the second set of shafts as driven by the first and the second drive means.

7. An apparatus for capturing light energy according to claim 6 further comprising means for detecting whether or not the light receptors supported by the light assembly assume a reference attitude, the drive control means being responsive to the detection of the reference attitude to update the attitude data to the reference attitude, responsive to the presence of the solar radiation at or above a given level to pulse the first and the second drive means and to update the attitude data by an amount corresponding to a change in the attitude which is attributable to the pulsing, and responsive to the absence of the solar radiation at or above a given level to cease the drive and to determine the time elapsed while ceasing the drive, and also responsive to a change from the absence to the presence of the solar radiation at or above the given level to drive the first and the second drive means with pulses of a higher rate by an amount corresponding to a change in the position of the sun which occurs during the time elapsed and to update the attitude data in a corresponding manner.

8. An apparatus for capturing light energy according to claim 7 in which the drive control means pulses the first and the second drive means while updating the attitude data by adding an amount corresponding to a change in the attitude which is caused by the pulsing, the drive control means establishing the light receptors in the reference attitude in the absence of the solar radiation at or above the given level and when the attitude data is outside a given range, thus waiting for the presence of the solar radiation at or above the given level.

9. An apparatus for capturing light energy according to claim 8 in which the drive control means establishes the light receptor at the reference attitude when the attitude data added with a change in the position of the sun which occurs during the time elapsed is out of a given range in the absence of the solar radiation at or above a given level, thus waiting for the presence of the solar radiation at or above a given level.

10. An apparatus for capturing light energy according to claim 1 in which the first set of shafts includes a plurality of shafts which support a plurality of support assemblies which have the same construction with the first and the second support assemblies, the first drive means acting through an interlocked mechanism to drive the plurality of shafts in the first set simultaneously for rotation in the same direction.

11. An apparatus for capturing light energy according to claim 1 further comprising means for detecting a misalignment of the light receptor supported by the support assembly relative to the position of the sun, and drive control means for driving the first set of shafts and the second set of shafts for rotation through the first and the second drive means in a manner to reduce the misalignment.

12. An apparatus for capturing light energy according to claim 1 in which the first set of light receptors including a casing having a bottom plate, side plates surrounding an opening which is located opposite to the bottom plate, and a light transmitting member which closes the opening, a first mirror disposed within the casing for reflecting light which passes through the light transmitting member into the casing, and a second mirror formed by a compact curved mirror having a relatively short focal length which is disposed within the casing forwardly of the first mirror and supported by the light transmitting member for reflecting light reflected by the first mirror, at least one of the light transmitting member and the first mirror being a condensing element having a relatively long focal length.

13. An apparatus for capturing light energy according to claim 12 in which the first support assembly includes a first wheel fixedly connected on the first shaft in the second set with a center of rotation aligned with the axis thereof, and a first worm disposed parallel to the first set of shafts and in meshing engagement with the first wheel, and in which the second support assembly includes a second wheel fixedly connected on the second shaft in the second set with a center of rotation aligned with the axis thereof, and a second worm disposed parallel to the shafts of the first set and in meshing engagement with the second wheel, the second drive means including a fastener member and a prime mover for mechanically coupling the first and the second worm together so as to rotate them in the same direction simultaneously.

14. An apparatus for capturing light energy according to claim 12 in which each of the first and the second set of light receptors comprises a light collector including an optical fiber having a front end face which is disposed opposite to the second mirror and having a center which is located on the optical axis of the second mirror.

15. An apparatus for capturing light energy according to claim 14 in which the light collector further includes a conical reflecting surface which extends through the bottom plate at a point of intersection of the optical axis of the second mirror with the bottom plate and having an axis which is defined by the optical axis and disposed opposite to the second mirror to receive light reflected from the second mirror, and a lighting cone continuing with the optical fiber at the apex of the cone.

16. An apparatus for capturing light energy according to claim 14 in which the light collector further includes a lighting member having a conical reflecting surface extending through the bottom plate at a point of intersection between the optical axis of the second mirror and the bottom plate, having an axis defined by the optical axis and disposed opposite to the second mirror to receive light reflected therefrom, a lighting conical opening which continues with an optical fiber at the apex of the cone and a channel for passing a heat exchange fluid therethrough.

17. An apparatus for capturing light energy according to claim 12 in which the first mirror comprises a curved mirror of a relatively large size and having a relatively long focal length which reflects and collects light passing through the light transmitting member into the casing, the second mirror being located on the optical axis of the first mirror.

18. An apparatus for capturing light energy according to claim 12 in which each of the first and the second set of light receptors includes a valve unit mounted on the casing, including an inner port which is open into the internal space of the casing, an outer port which is open to the outside of the casing and a valve element for opening and closing the path between the both ports.

19. An apparatus for capturing light energy according to claim 12 in which the light transmitting member is a Fresnel lens of a relatively large size and having a relatively long focal length.

20. An apparatus for capturing light energy according to claim 12 in which the light transmitting member is a Fresnel lens of a relatively large size and having a relatively long focal length, and the first mirror comprises a plane mirror.

21. An apparatus for capturing light energy according to claim 12 in which the light transmitting member is a Fresnel lens of a relatively large size and having a relatively long focal length, and the first mirror is a curved mirror.

22. An apparatus for capturing light energy according to claim 12 in which each of the first and the second set of light receptors comprises a heat collector including a photo-thermal conversion member having a photo-thermal conversion surface located opposite to the second mirror, a channel for passing a heat exchange fluid therethrough, and a fluid feed/discharge tube connected to the channel.

23. An apparatus for capturing light energy according to claim 22 in which the first mirror is a curved mirror of an increased size and having a relatively long focal length which reflects and condenses light passing through the light transmitting member into the casing, and the second member is located on the optical axis of the first mirror.

24. An apparatus for capturing light energy according to claim 22 in which the photo-thermal conversion member has a conical photo-thermal conversion surface which extends through the bottom plate at the point of intersection between the optical axis of the second mirror and the bottom plate, which has an axis defined by the optical axis and which is disposed opposite to the second mirror to receive light reflected therefrom.

25. An apparatus for capturing light energy according to claim 12 in which each of the first and the second set of light receptors comprises a heat collector including a photo-thermal conversion member having a channel located opposite to the second mirror and passing through the conversion member at the light axis of the second mirror, a light transmitting member hermetically closing the top opening of the channel and a pair of fluid feed/discharge tube, on of which is connected to the bottom opening of the channel.

26. An apparatus for capturing light energy according to claim 25 in which the first mirror is a curved mirror of a relatively large size and having a relatively long focal length which reflects and condenses light passing into the casing, and the second mirror is located on the optical axis of the first mirror.

27. An apparatus for capturing light energy according to claim 25 in which the tube which is connected to the bottom opening of the channel has an inner metal pipe having inner surface of a blackening treatment for the photo-thermal conversion.

* * * * *